(12) United States Patent
Gosselin et al.

(10) Patent No.: US 6,743,452 B2
(45) Date of Patent: Jun. 1, 2004

(54) ONE-DISH FROZEN DINNER PRODUCT HAVING AN INTEGRAL BREAD RING AND APPARATUS FOR SHIPPING AND PREPARING SAME

(75) Inventors: Amy L. Gosselin, Westchester, IL (US); Frank Cole, Glenview, IL (US); Steven Greiner, Mundelein, IL (US); Christopher P. Guzowski, Hoffman Estates, IL (US); Amy Lynne Zettlemeyer, Dublin, CA (US); Barbara Sue Schwab, Grayslake, IL (US); Richard William Livezey, Verona, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 95 days.

(21) Appl. No.: 10/100,999

(22) Filed: Mar. 19, 2002

(65) Prior Publication Data

US 2002/0136806 A1 Sep. 26, 2002

Related U.S. Application Data

(63) Continuation-in-part of application No. 09/822,630, filed on Mar. 30, 2001, now Pat. No. 6,733,808, which is a continuation-in-part of application No. 09/729,993, filed on Dec. 4, 2000.

(51) Int. Cl.[7] .................................................. A21D 6/00
(52) U.S. Cl. ...................... 426/114; 426/128; 426/383; 426/391; 426/393; 426/502; 426/505; 426/517; 426/524
(58) Field of Search ................................. 426/113, 114, 426/128, 383, 391, 393, 502, 505, 517, 520, 524

(56) References Cited

U.S. PATENT DOCUMENTS

| | | |
|---|---|---|
| 793,653 A | 7/1905 | Gorman |
| 843,109 A | 2/1907 | Sabin |
| 868,312 A | 10/1907 | Wilcox |
| 1,097,367 A | 5/1914 | Sabin |
| 1,180,782 A | 4/1916 | McLaughlin |
| 1,375,539 A | 4/1921 | Scott |
| 1,827,062 A | 10/1931 | Austin |
| 1,834,402 A | 12/1931 | Houston |
| 1,903,682 A | 4/1933 | Moore |
| 2,174,425 A | 9/1939 | Schlumbohm |
| 2,257,408 A | 9/1941 | Alexander |
| 3,724,711 A | 4/1973 | George et al. |
| 3,951,053 A | 4/1976 | Kirkpatrick |
| 3,987,719 A | 10/1976 | Kian |
| 4,080,884 A | 3/1978 | Terrell |
| 4,122,324 A | 10/1978 | Falk |

(List continued on next page.)

FOREIGN PATENT DOCUMENTS

EP 0 326 811 A1 8/1989

*Primary Examiner*—Drew Becker
(74) *Attorney, Agent, or Firm*—Fitch, Even, Tabin & Flannery

(57) ABSTRACT

A one-dish frozen dinner product having an integral bread ring is provided. A method for making a one-dish frozen dinner product having an integral bread ring is also provided. The one-dish frozen dinner product preferably includes a receptacle containing the one-dish frozen dinner product, a baking shield upstanding above the receptacle, and a shipping carton. Even more preferably, the baking shield is placed at the bottom of the receptacle containing the one-dish frozen dinner product and is configured for a nesting fit. The baking shield may have either a frustoconical sidewall or a concave trough-like sidewall.

12 Claims, 12 Drawing Sheets

U.S. PATENT DOCUMENTS

| | | |
|---|---|---|
| 4,207,348 A | 6/1980 | Vermilyea et al. |
| 4,283,424 A | 8/1981 | Bone et al. |
| 4,303,677 A | 12/1981 | De Acetis |
| 4,367,243 A | 1/1983 | Brummett et al. |
| 4,542,271 A | 9/1985 | Tanonis et al. |
| 4,563,946 A | 1/1986 | Barlow et al. |
| 4,785,968 A | 11/1988 | Logan et al. |
| 4,788,067 A | 11/1988 | Seneau |
| 4,861,601 A | 8/1989 | Seneau |
| 4,865,219 A | 9/1989 | Logan et al. |
| D303,908 S | 10/1989 | Anderson |
| 4,919,946 A | 4/1990 | Pak et al. |
| 4,963,708 A | 10/1990 | Kearns et al. |
| D333,590 S | 3/1993 | Harris |
| 5,206,045 A | 4/1993 | Stuck |
| 5,238,692 A | 8/1993 | Taga et al. |
| 5,247,149 A | 9/1993 | Peleg |
| D343,548 S | 1/1994 | Helfer |
| 5,416,304 A | 5/1995 | De La Cruz et al. |
| D362,995 S | 10/1995 | Marsico |
| 5,456,162 A | 10/1995 | Polizzotto |
| D364,533 S | 11/1995 | Brophy |
| 5,503,063 A | 4/1996 | Sebald |
| D369,941 S | 5/1996 | Ramina |
| 5,595,773 A * | 1/1997 | Wada et al. .................. 426/20 |
| D384,550 S | 10/1997 | Dernoga |
| D384,857 S | 10/1997 | Beaule |
| 5,789,009 A * | 8/1998 | Kordic et al. ................ 426/391 |
| 5,806,411 A | 9/1998 | Howle |
| 5,823,098 A | 10/1998 | Perry |
| 5,845,805 A | 12/1998 | Ragland |
| D408,215 S | 4/1999 | Williams |
| 6,026,739 A | 2/2000 | Dernoga |
| 6,054,697 A * | 4/2000 | Woodward et al. ......... 219/729 |
| 6,063,413 A | 5/2000 | Houraney et al. |
| 6,308,833 B1 * | 10/2001 | Oravez ....................... 206/541 |

* cited by examiner

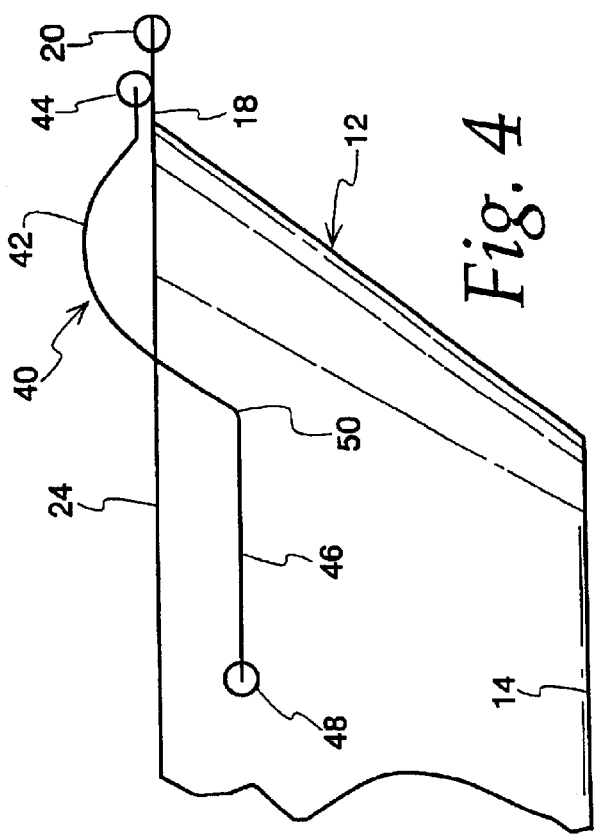
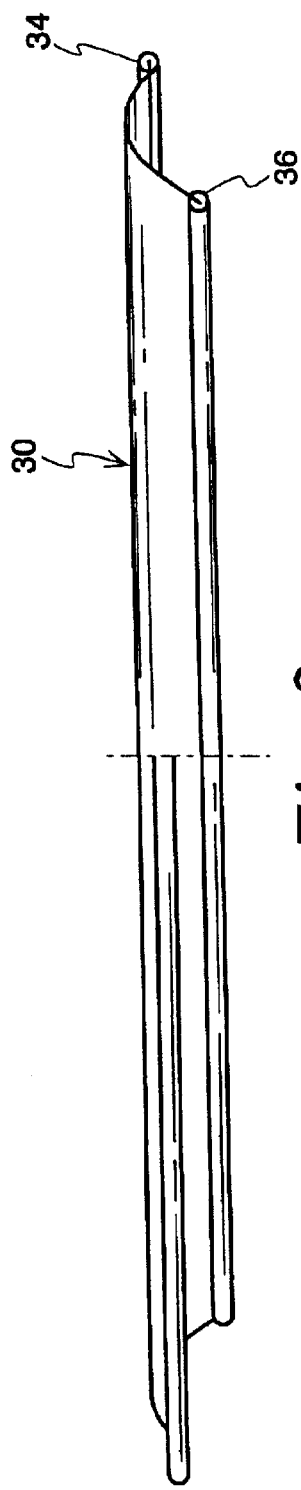
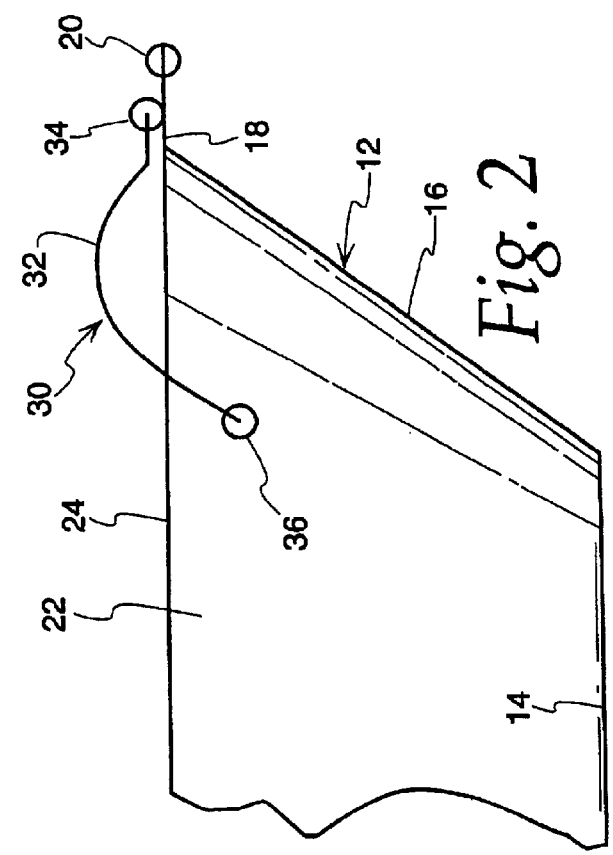

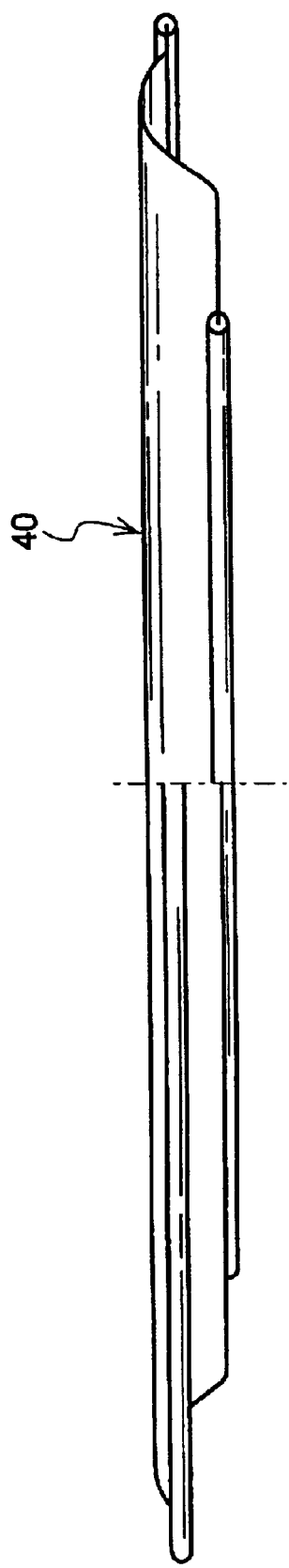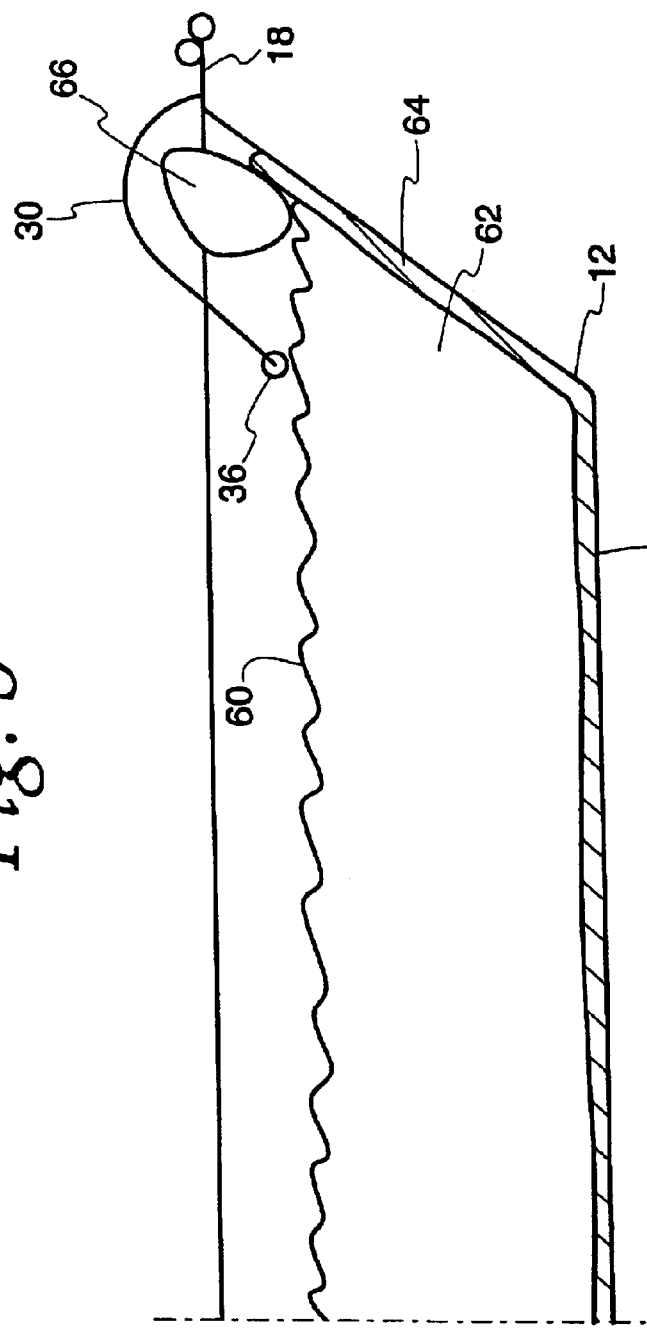

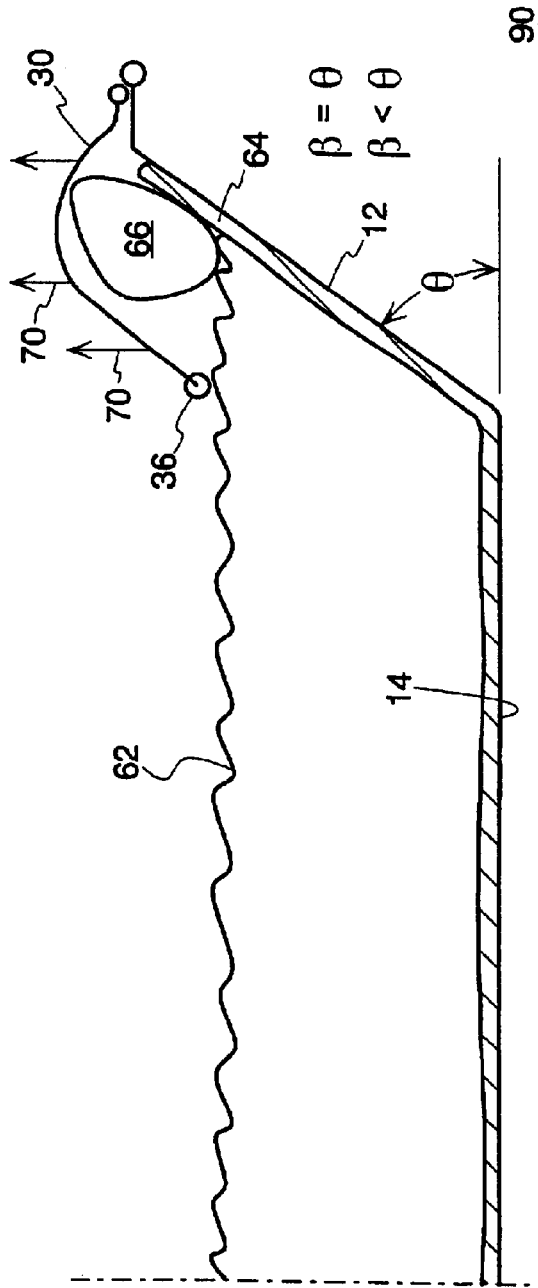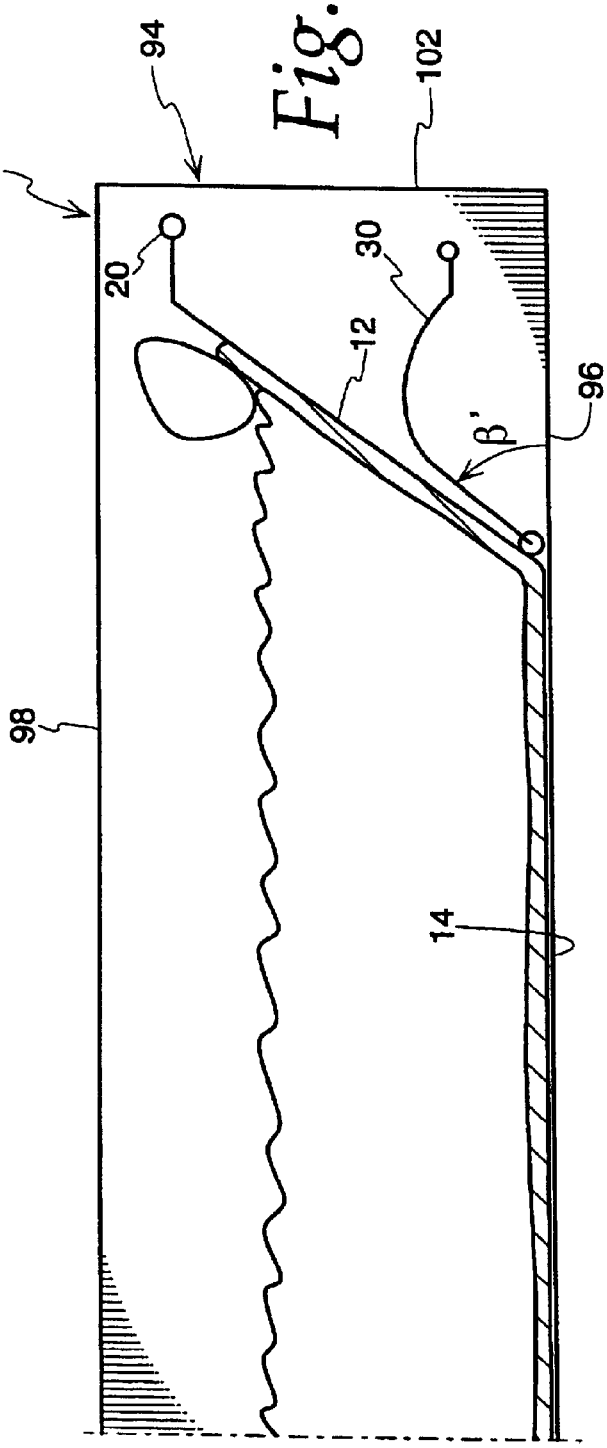

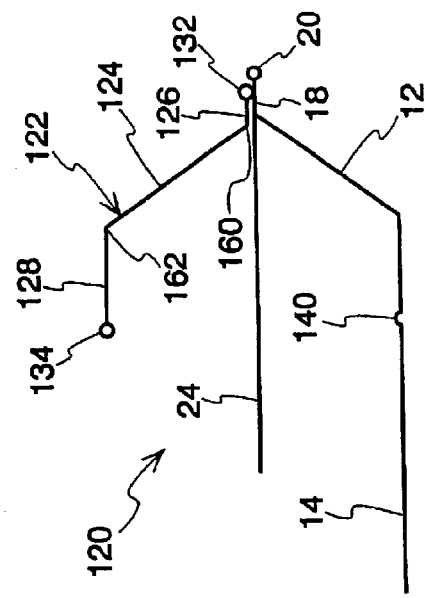
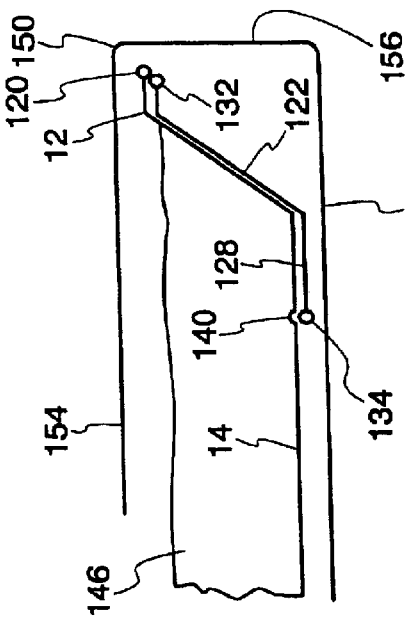
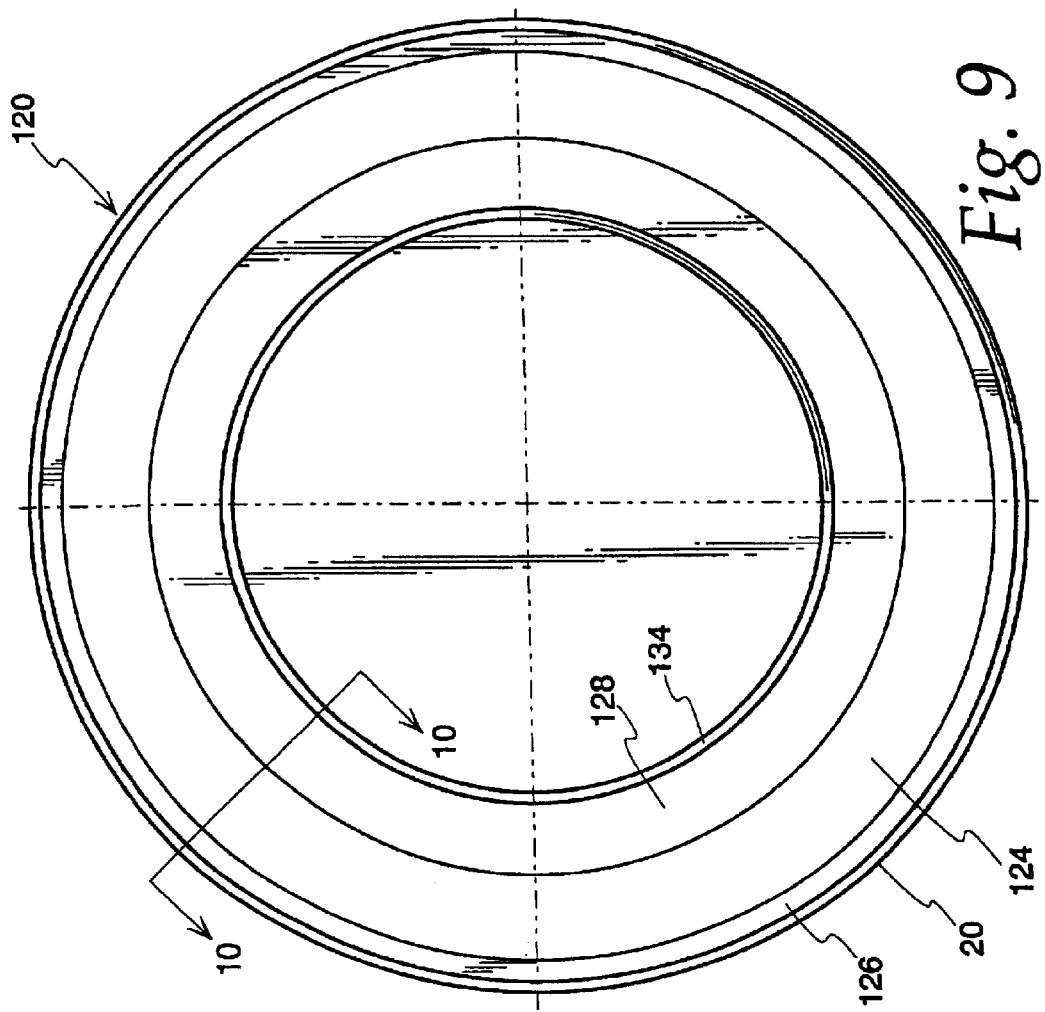

Figure 19B
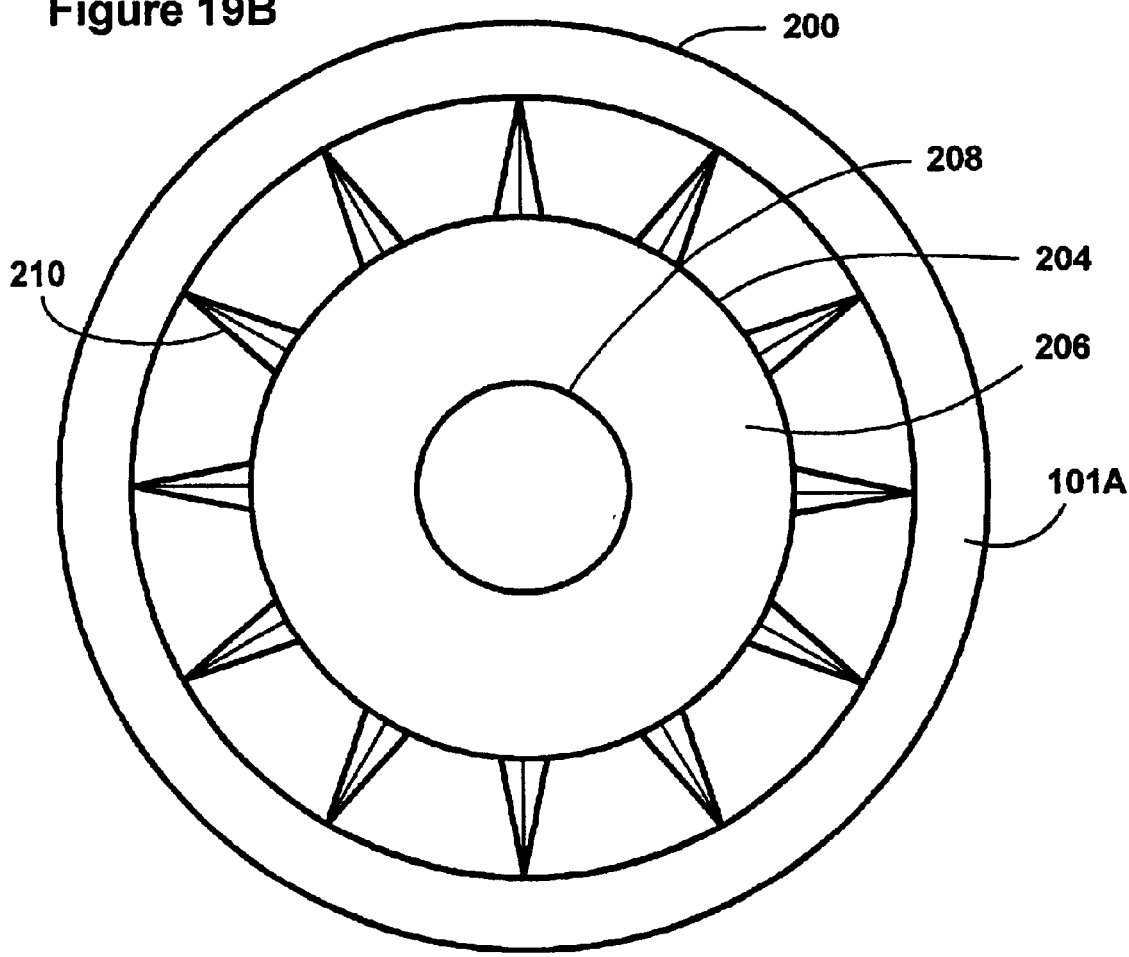
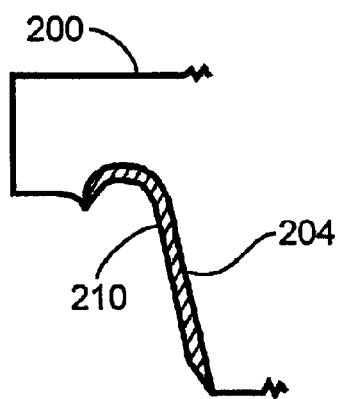
Figure 19C

US 6,743,452 B2

ONE-DISH FROZEN DINNER PRODUCT HAVING AN INTEGRAL BREAD RING AND APPARATUS FOR SHIPPING AND PREPARING SAME

RELATED APPLICATION

This application is a continuation-in-part of U.S. patent application Ser. No. 09/822,630, filed on Mar. 30, 2001 now allowed, which was a continuation-in-part of U.S. patent application Ser. No. 09/729,993, filed on Dec. 4, 2000 now allowed.

BACKGROUND OF THE INVENTION

1. Field of the Invention

This invention is directed to a one-dish frozen dinner product having an integral bread ring. This invention is also directed to a one-dish frozen dinner product having an integral bread ring packaged with the apparatus of this invention for baking products having an outer portion susceptible to overcooking. The present invention also provides methods for making one-dish frozen dinner products having an integral bread ring. The invention also pertains to apparatus for baking pies and the like food products, especially one-dish frozen dinner products having integral bread rings, which have an outer portion susceptible to overcooking. The invention is also directed to a kit for baking a food product, especially a one-dish frozen dinner product having an integral bread ring, which includes baking utensils packaged for commercial shipment.

2. Description of the Related Art

Bakers of food products, especially those in a commercial environment, have sought to reduce required cooking times without the risk of burning or overcooking sensitive portions of food items. Examples include various types of pie products, including pizza pies. These types of products typically include an outer crust which has been observed to be particularly susceptible to overcooking, due in part to the relatively low mass of the crust at the outer rim of the pie.

Various types of shields have been proposed to protect the sensitive outer portion of pie crusts. Examples of such shields are given in U.S. Pat. No. 5,206,045; U.S. Design Pat. No. 384,857; a "Pie Saver" product is also commercially available from Nancy's Kitchen/Beta Bake Products, Inc. of Lewiston, Me. Although the prior art arrangements provide certain improvements to baking shields, further improvements in baking shield performance and in adapting the baking shield for compact commercial packaging are still being sought. In addition, improvements in the manufacture of baking shields are also in demand, especially for high volume commercial products.

SUMMARY OF THE INVENTION

The present invention provides a one-dish frozen dinner product with an integral bread ring. The present invention also provides a one-dish frozen dinner product having an integral bread ring packaged with the apparatus of this invention for baking products having an outer portion susceptible to overcooking. The present invention also provides methods for making one-dish frozen dinner products having an integral bread ring.

The present invention also provides a kit for providing baked food products, such as pies and/or one-dish dinner products, including baking receptacles arranged in a commercial package. The present invention also provides baking kits of the above-described type which are quickly and easily deployed by a consumer, prior to baking. The present invention also provides baking utensils which are suitable for incorporation with a variety of prepared food product, in preparation for commercial shipment to a consumer. The present invention also provides baking shields offering improved performance despite volume expansion of the food product during cooking.

These and other benefits and advantages according to principles of the present are provided in a kit for shipping and preparing baked food products which has a sensitive outer marginal portion, including a frustoconical receptacle with a bottom, an open top, and an outer rim at the open top. The kit also has a food product disposed within said receptacle, below said outer rim, and a baking shield including an upstanding sidewall to engage the outer rim so as to be upstanding therefrom when in an installed position. The baking shield further includes an upper wall inwardly extending from said sidewall so as to form a central opening when in the installed position. The baking shield is stored at the bottom of the receptacle with a shipping carton surrounding the receptacle and the baking shield.

The present invention also provides a packaging kit for shipping baking utensils with a frustoconical receptacle with a bottom, an open top, and an outer rim at the open top. The kit also has a baking shield including an upstanding sidewall to engage the outer rim so as to be upstanding therefrom when in an installed position and an upper wall inwardly extending from said sidewall so as to form a central opening when in the installed position. The baking shield stored at the bottom of the receptacle, and a shipping carton surrounds the receptacle and the baking shield.

The present invention also provides a kit for preparing an uncooked or partially cooked pizza pie or frozen dinner product, having a frustoconical receptacle having a bottom, an open top, and an outer rim at the open top, a pizza pie or frozen dinner product disposed within the receptacle, and a baking shield including an upstanding sidewall to engage the outer rim so as to be upstanding therefrom. Additionally, the present invention provides a kit for preparing an uncooked or partially cooked one-dish frozen dinner product having an integral bread ring, having a frustoconical receptacle having a bottom, an open top, and an outer rim at the open top, one-dish frozen dinner product having an integral bread ring disposed within the receptacle, and a baking shield including an upstanding sidewall to engage the outer rim so as to be upstanding therefrom. The baking shield also includes an upper wall inwardly extending from said sidewall so as to form a central opening, and the sidewall of the baking shield has a first frustoconical portion and a second annular portion.

If desired, the baking shield of the kits described above can be used separately in other applications. For example, advantages of the invention can be attained in a baking shield for protecting an outer sensitive portion of a food product, held in a receptacle which has an outer rim, during baking. The shield includes an upstanding sidewall to engage the outer rim so as to be upstanding therefrom, and an upper wall inwardly extending from said sidewall so as to form a central opening. The sidewall of the baking shield includes an annular trough portion which has a first end adjacent the outer rim of the receptacle and a second end extending toward the center of the receptacle.

Further benefits and advantages of the invention can be attained in another baking shield for protecting an outer sensitive portion of a food product, held in a receptacle which has an outer rim, during baking. The baking shield has an upstanding sidewall to engage the outer rim so as to be upstanding therefrom, and an upper wall inwardly extending from said sidewall so as to form a central opening. The sidewall of the baking shield has a frustoconical portion disposed between first and second annular portions. Other benefits and advantages of the invention, both as related to the baking apparatus and the one-dish frozen dinner product, will be apparent upon consideration of the present specification and drawings.

BRIEF DESCRIPTION OF THE DRAWINGS

FIG. 2 is a cross-sectional view taken along the line 2—2 of FIG. 1;

FIG. 3 is a fragmentary elevational view thereof;

FIG. 4 is a fragmentary cross-sectional view showing an alternative baking utensil arrangement;

FIG. 5 is a fragmentary elevational view for the baking utensil arrangement of FIG. 4;

FIG. 6 shows a food product in combination with the arrangement of FIG. 2;

FIG. 7 is a view similar to that of FIG. 6 but showing the shield being raised during baking;

FIG. 8 shows the baking utensil and food product in a shipping carton;

FIG. 9 is a top plan view of an alternative embodiment of the baking apparatus according to principles of the invention;

FIG. 10 is a fragmentary cross-sectional view taken along the line 10—10 of FIG. 9;

FIG. 11 is a cross-sectional view similar to that of FIG. 10 but showing the shield in an inverted, nested position, ready for shipment;

FIG. 14 illustrates the one-dish frozen dinner product having an integral bread ring in combination with the baking pan or receptacle.

DETAILED DESCRIPTION OF THE PREFERRED EMBODIMENTS

The various embodiments of the baking apparatus and/or baking utensil will first be described. After which, the one-dish frozen dinner product with an integral bread ring will be described. The one-dish frozen dinner product of the present invention is especially adapted for use with the baking apparatuses and/or baking utensils described herein.

Figure 1:
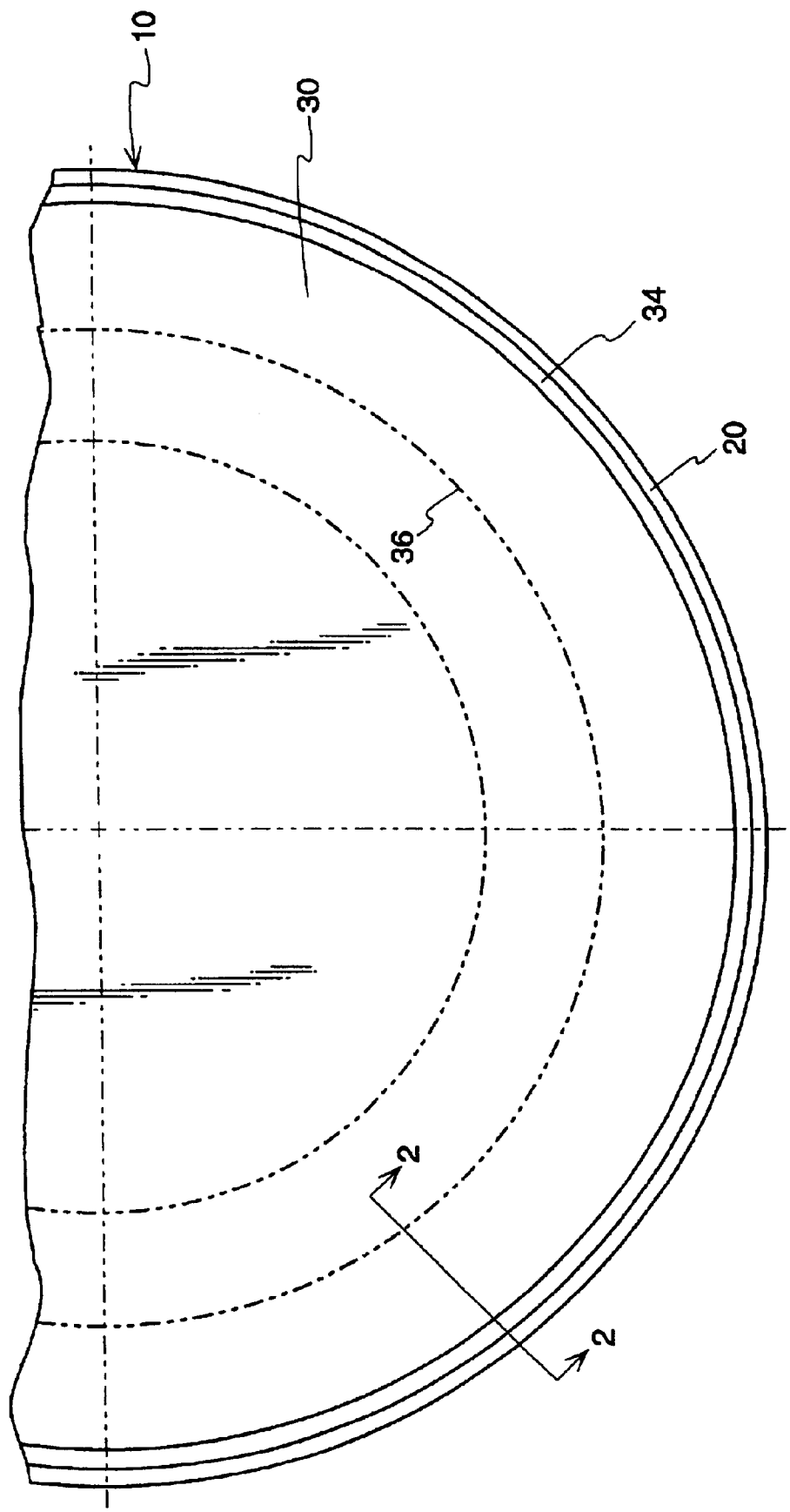
FIG. 1 is a plan view of baking utensils according to principles of the invention.

Baking Apparatus. Referring now to the drawings, and initially to FIGS. 1–3, a baking utensil arrangement is generally indicated at 10. As shown in FIG. 2, a receptacle 12 is preferably made of aluminum foil although other materials could also be employed, if desired. Receptacle 12 has a bottom 14, a pressed conical sidewall 16 and an outer rim 18 having an outer free edge 20, which preferably is rolled. Receptacle 12 defines a cavity 22 and an open top 24.

A baking shield 30 preferably made of light weight aluminum foil includes a concave or trough portion 32 having a first end 34 adjacent the outer rim 28 of receptacle 12 and a second end 36 extending toward the center of receptacle 12. As indicated in FIG. 2, the second end of baking shield 30 preferably lies below the top 24 of receptacle 12, so as to penetrate cavity 22. As indicated in the figures, the ends 34, 36 of baking shield 30 preferably have rolled edges. As shown in FIG. 2, baking shield 30 is preferably dimensioned such that outer edge 34 receives support from receptacle 12, and most preferably from the rim 18 of receptacle 12.

Referring to FIGS. 4 and 5, an alternative embodiment of the baking shield is generally indicated at 40. Baking shield 40 also has an annular trough portion 42 with an end 44 adjacent the outer end 20 of receptacle 12. However, unlike baking shield 30, baking shield 40 includes an annular, generally horizontal portion 46 with a free end 48, which is preferably rolled. Baking shield 40 includes a curved or radiused portion 50, although a sharp corner or other cross-sectional shape can be employed to blend trough portion 42 with annular portion 46. As with baking shield 30, it is generally preferred that the interior portion of baking shield 40 be disposed below the top 24 or receptacle 12. However, if desired, the interior ends 36, 48 of baking shields 30, 40 could be raised to a point at or above the top end of receptacle 12. It is generally preferred that baking shield 40 be dimensioned such that the outer end 44 receive support directed from the outer portion of receptacle 12, preferably rim 18.

Baking shields 30, 40 according to principles of the invention, provide a number of advantages. For example, it is generally preferred that the baking shields be formed of relatively light weight aluminum material which receives structural strength from the concave bending to form the trough portions of the baking shields. In the preferred embodiment, baking shield 30 is formed from aluminum material having a thickness ranging between about 0.0020 and about 0.0050 inches. Most preferably, baking shield 30 is formed from aluminum material having an approximate thickness of about 0.0025 inches. It is also preferred that the ends of the baking shields contain rolled edges to provide further stiffness. If further strengthening of the baking shield is desired, the baking shield can be formed with a plurality of generally radially extending grooves or ridges to take on a "corrugated" effect.

In the preferred embodiment, the receptacle 12 (and hence the baking shields) have a circular shape when viewed from above. Accordingly, the baking shields of the preferred embodiment form an endless loop when viewed in plan. The rolled edges taken in combination with the concave trough portion adds a substantial amount of strength when arranged in a circular form, as in the preferred embodiment. Baking shield 40 also benefits from the joining portion 50 which, in the preferred embodiment, forms a circular interior corner. It will be readily appreciated by those skilled in the art that the baking shields can be readily configured to conform to a receptacle which is square or otherwise polygonal in shape, when viewed from above.

Baking utensil arrangements according to principles of the invention offer further advantages, particularly when baking shield portions thereof are formed of light weight foil material. As noted above, it is preferred that the outer ends 34, 44 of baking shields 30, 40 nest within the outer edge 20 of receptacle 12. This allows a user to grasp receptacle 12 in a usual manner, without inadvertently applying pressure to the baking shields. This is important, for example, when a user wishes to temporarily remove the baking utensil arrangement in order to inspect cooking progress, thereafter returning the baking utensil arrangement to the oven for further baking. Further, by dimensioning the baking shields 30, 40 to a size smaller than that of the free edges of the receptacle rim, the baking shield is held in place, in its desired position, during baking, even in the presence of relatively strong convection currents which may be set up within an oven.

With reference to FIGS. 2 and 4, the trough portions of baking shields 30, 40 help to direct radiant energy toward the center of receptacle 12 where the greatest mass of food product is located. With reference to FIGS. 6 and 7, and initially to FIG. 6, the interior free edge 36 of baking shield 30 is located at or near the upper edge 60 of a food product. Illustrated in FIG. 6 is a pizza pie food product or frozen dinner food product having a filling 62, a crust 64 and an optional dough ring 66 which may be formed integrally with crust 64 but, when provided, is preferably separately formed from crust 64. If desired, the baking shield may be used to provide different baking characteristics for the dough ring 66 relative to that of crust 64. During cooking, the heights of filling 62, dough ring 66, and/or crust 64 will rise or expand during baking, and may cause the baking shield 30 to "lift off" or be displaced in a vertical direction as indicated by arrows 70. The concave, trough portion of baking shield 30 imparts a balance, or positional stability to the baking shield throughout the cooking process. Of course, the dimensions of the baking shield may be adjusted such that displacement does not occur during baking.

The food product mentioned above comprises a conventional, cost efficient pizza pie or frozen dinner product having a sensitive outer peripheral portion which includes a relatively low mass, low heat capacity portion comprising crust 64 and optional dough ring 66. The baking shields herein provide a shielding or retarding of the heating effects on this sensitive outer marginal portion, allowing the food product to be uniformly cooked, without rendering the outer marginal portion less desirable.

Although pizza pies or frozen dinner products have been found to receive immediate commercial benefit from the invention, it must be recognized that the invention may also be employed with other types of food products, such as thick soups and stews, as well as dinners of macaroni and cheese, chicken fettuccine, ravioli, or lasagne, for example. Although these products may not have crust portions in the sensitive outer marginal area, those familiar with food preparation will recognize that the outer margin of these types of food products may nonetheless overcook or become thicker or otherwise less desirable than central portions of food product disposed in receptacle 12.

Although a substantial improvement in the structural integrity of the baking shields is provided by the invention, it must be recognized that the preferred choice of material, relatively light weight aluminum foil, still renders the baking shields susceptible to crushing, especially when a substantial force is applied. Referring to FIG. 6, for example, a manufacturer may wish to provide consumers with a kit for shipping and preparing baked food products having sensitive outer marginal portions. With the food and the baking kit is shipped in the form shown in FIG. 6, protection must be provided for the dome or trough portion of the baking shield. Such protection, in order to be effective, must receive support from the rim of the receptacle or from the surface supporting floor 14 of the receptacle. Such protection, and the arrangement shown in FIG. 6 must then be overwrapped to prevent contamination during shipment.

Referring to FIG. 8, a kit for shipping and preparing baked food products is generally indicated at 90. Kit 90 includes the aforementioned baking utensils, including receptacle 12 and baking shield 30. Kit 90 further includes the food product contained in receptacle 12 and an outer carton 94 having a bottom wall 96 supporting the bottom wall 14 of receptacle 12, an opposed upper wall 98, and a sidewall 102. As indicated in FIG. 8, baking shield 30 is dimensioned and configured so as to nest with the bottom portion of receptacle 12, in a manner with holds the baking shield in a protected fixed position, during shipment. Preferably, the inner end 36 of baking shield 30 is dimensioned so as to receive the bottom portion of receptacle 12. Further, it is preferred that the interior part of trough portion 30 form an angle β less than or equal to the angle θ of receptacle 12 (see FIG. 7). This arrangement allows a close fit in the corner of carton 90 defined by trapezoidal sidewall of receptacle 12. As shown in FIG. 8, for example, with shifting of the carton contents, the outer edge 20 of receptacle 12 will contact carton sidewall 102, preventing damage to the baking shield 30.

Referring to FIGS. 4 and 8, baking shield 40 can be substituted in the kit arrangement shown in FIG. 8. Preferably, portion 42 of baking shield 40 is configured to be substantially identical with baking shield 30, and annular portion 46 is positioned to underlie the bottom wall 14 of receptacle 12. It is generally preferred in this arrangement that portion 46 be formed to take on a planar configuration so as to conform to the bottom wall 14 of receptacle 12 to avoid crushing or other deformation. For a close tolerance nesting fit, curvature of corner 50 is made to conform to the lower corner of receptacle 12, between the bottom and sidewalls. If desired, the internal diameter of corner 50 can be made slightly larger than the diameter of bottom wall 14 of receptacle 12. As a further alternative, baking rings and packaging arrangements according to the invention can readily accommodate receptacles having a different shape from that illustrated in the drawings. For example, with reference to FIG. 7, the angle θ can be made more vertical, but preferably will have a value less than 90 degrees; smaller angles, such as those illustrated in the figures, are generally desired because they exhibit a greater strength in shipping and are more conducive to the shapes of the nested baking shields of the type described herein. In either event, it will be appreciated that baking shield 40, when arranged in the packaging arrangement shown in FIG. 8, will be maintained in a secure position without crushing during shipment.

Figure 12:
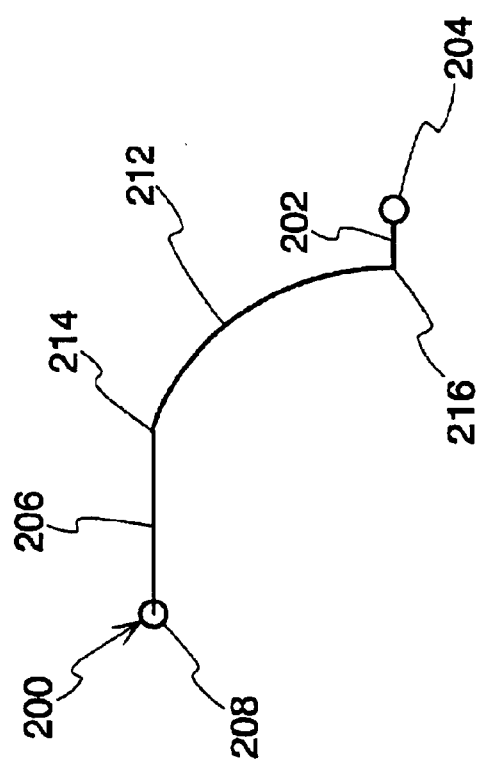

Turning now to FIGS. 9–11, another baking utensil arrangement is generally indicated at 120. With reference to FIG. 10, included in arrangement 120 is receptacle 12 and a baking shield 122 having a frustoconical portion 124 disposed between annular portions 126, 128. If desired, sidewall 124 can be curved so as to be concave when viewed from the interior of receptacle 12 (as shown in FIG. 12, for example). As will be appreciated by those skilled in the art, the annular portion 128 can be readily re-dimensioned, as desired, without a complicated change in the required tooling.

As with the aforementioned baking shields, baking shield 122 stands above the upper end 124 of receptacle 12 and is configured so as to extend inwardly, toward the center of the receptacle, and the food product contained therein. As mentioned above with reference to FIGS. 7 and 8, a dough ring may be provided at the upper corner of the food product. The upstanding baking shield 122 allows clearance such that contact with the dough ring is avoided as the dough rises. Further, the baking shield 122 prevents excessive radiative heat transfer to the sensitive portion of the food product, while allowing convective heat transfer to circulate around the dough ring, providing sufficient, non-scorching heat to permit the dough ring to fully rise.

Preferably, the baking shield 122 is formed of aluminum foil, having a thickness range as stated above with respect to the other baking shields. It is generally preferred that annular portions 126, 128 have finished, free edges 132, 134 which are preferably rolled. The free edge 132 is dimensioned so as to receive support from rim portion 18 of receptacle 12 and so as to lie inwardly of rolled edge 20. This arrangement assures desired orientation of the baking shield with respect to receptacle 12, despite convection currents in the baking oven, or misaligning forces as the baking utensil arrangement is transferred into and out of an oven. With the invention, annular portion 128 can be readily re-dimensioned as required to adjust the portion of food product shielded from radiative scorching or overcooking.

Packaging of the baking utensil arrangement 120 is shown in FIG. 11. Baking shield 122 is inverted from its operational or installed position indicated in FIG. 10. Preferably, the frustoconical wall 124 is configured such that included angles formed between the frustoconical wall and annular walls 126, 128 conform to the configuration of receptacle 12 so as to form a close fit nesting arrangement shown in FIG. 11. With reference to FIGS. 10 and 11, a trough or recess 140 may be formed in lower wall 13 so as to receive the rolled free edge 134 of baking shield 122. The baking utensils may be shipped alone, or in combination with a food product schematically indicated at 146. A carton 150 is provided for shipment and includes a bottom wall 152 to support both receptacle 12 and baking shield 122, an opposed top wall 154 and a sidewall 156. As indicated in FIG. 11, it is generally preferred that the free edge 132 be dimensioned so as to fit within the free edge 20 of receptacle 12, so as to receive protection, during shipment.

Figure 13:
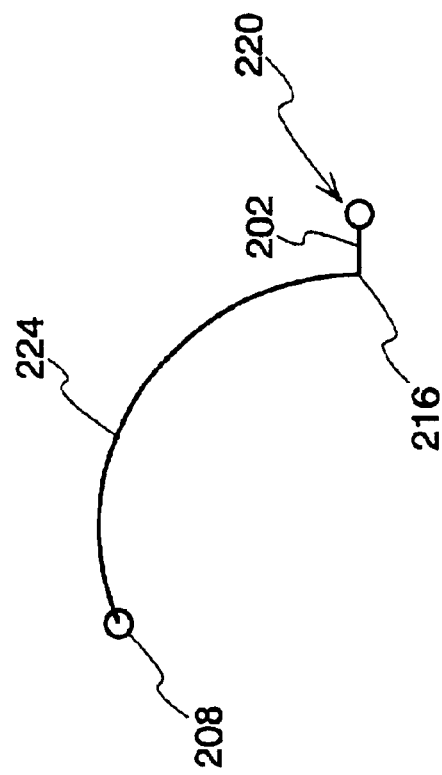
FIGS. 12 and 13 show alternative baking shield arrangements.

Referring now to FIGS. 12 and 13, alternative embodiments of the baking shield are shown. In FIG. 12 a baking shield 200 includes a lower annular rim portion 202 terminating in an edge 204 which is preferably rolled. Baking shield 200 further includes an upper annular portion 206 having an end 208 which is also preferably rolled. A concave sidewall 212 extends between points 214, 216 (i.e., at the inner ends of annular portions 202, 206). The shield 200 is preferably formed of aluminum material having a thickness as stated above with the other baking shields, but can be made from other conventional materials, as well. Most preferably, the annular walls 202, 206 correspond in size to the annular walls 126, 128 shown in FIG. 10. That is, most preferably, baking shield 200 is a modification of baking shield 122, replacing the frustoconical wall 124 shown in FIG. 10 with a concave wall 212 shown in FIG. 12.

FIG. 13 shows a further alternative baking shield 220 substantially identical to baking shield 200 but with the upper annular wall 206 and concave wall 212 being replaced by a single, continuous curved wall 224. Baking shield 220 is preferably made of aluminum material of the thicknesses stated above for the other baking shields. As with the other baking shields described herein, it is preferred that baking shield 220 be formed of a single piece, monolithic construction, as by forming a sheet of appropriate aluminum material.

It will be readily appreciated that the invention accommodates a variety of different packaging methods. For example, it may be desirable to apply an overwrap of plastic film or other material to the arrangement illustrated in FIG. 6 or to the receptacle 12 and its contents, shown in FIG. 8. With the preferred nesting arrangement shown in FIG. 8, an overwrap may be applied to both the shield 30 as well as receptacle 12 and its contents contained therein. In a similar manner, an overwrap may be applied to the nested arrangement of shield 122 and receptacle 12 shown in FIG. 11. The more compact nested arrangement of FIG. 11 is advantageous in assuring that deformation of shield 122 will not develop when the overwrapping is applied to the contents located within the carton 150.

Advantages of increased structural stability are provided by the invention. As mentioned, the edges 132, 134 of baking shield 122 are rolled, adding stiffness to a product which is preferably formed from light weight foil material, as mentioned. In addition, baking shield 122 is formed with two laterally and vertically offset interior corners 160, 162 which contribute with the rolled edges to provide heretofore unobtained structural strength and rigidity. As schematically indicated in FIG. 10, it is generally preferred that annular wall 126 be substantially smaller in size than upper annular wall 128. This allows the rolled free edge 132 and the substantial portion of annular wall 126 to receive direct support from rim 18 of receptacle 12. With the preferred rolled edge 132, interference with rolled edge 20 prevents "pancake" deformation or outward spreading or collapse of the baking shield as pressure is applied from above. Resistance to spreading deformation is further provided by the inclusion of two interior corners 160, 162 and by the rolled inner edge 134 of the baking shield.

If desired, baking shields according to the invention can be made from much heavier "permanent" weight aluminum material, commonly used for pots or pans, for example. While aluminum is the most preferred material for making the baking shield, other materials, such as, for example, ceramics, polymers, treated paper products, and the like could also be employed.

One-dish Frozen Dinner Product Having an Integral Bread Ring. This invention also provides a one-dish frozen dinner product having an integral bread ring. The one-dish frozen dinner product having an integral bread ring is especially adapted for use with the apparatus of this invention for baking products having an outer portion susceptible to overcooking. The present invention also provides methods for making one-dish frozen dinner products having an integral bread ring.

The one-dish frozen dinner product of this invention comprises a frozen combination of a raw dough, self-rising crust, a filling mixture, and a raw dough, self-rising bread ring. Generally, the one-dish frozen dinner product of this invention contains about 15 to about 30 percent of the raw dough, self-rising crust, about 50 to about 75 percent of the filling mixture, and about 10 to about 25 percent of the raw dough, self-rising bread ring. More preferably, the one-dish frozen dinner product of this invention contains about 20 to about 28 percent of the raw dough, self-rising crust, about 55 to about 65 percent of the filling mixture, and about 12 to about 20 percent of the raw dough, self-rising bread ring. Generally, the filling mixture contains a blend of ingredients selected from the group consisting of pasta, potatoes, meat (e.g., beef, lamb, chicken, turkey, or fish), vegetables, cheese, and sauce.

Figure 14A:
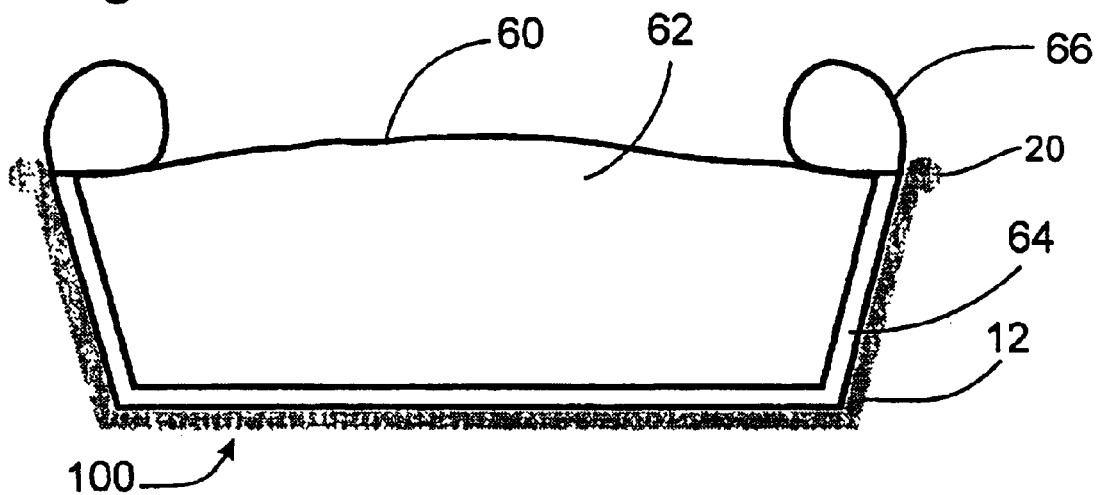
FIG. 14A is a cross-sectional view from the side and FIG. 14B is a view from the top.
Figure 14B:
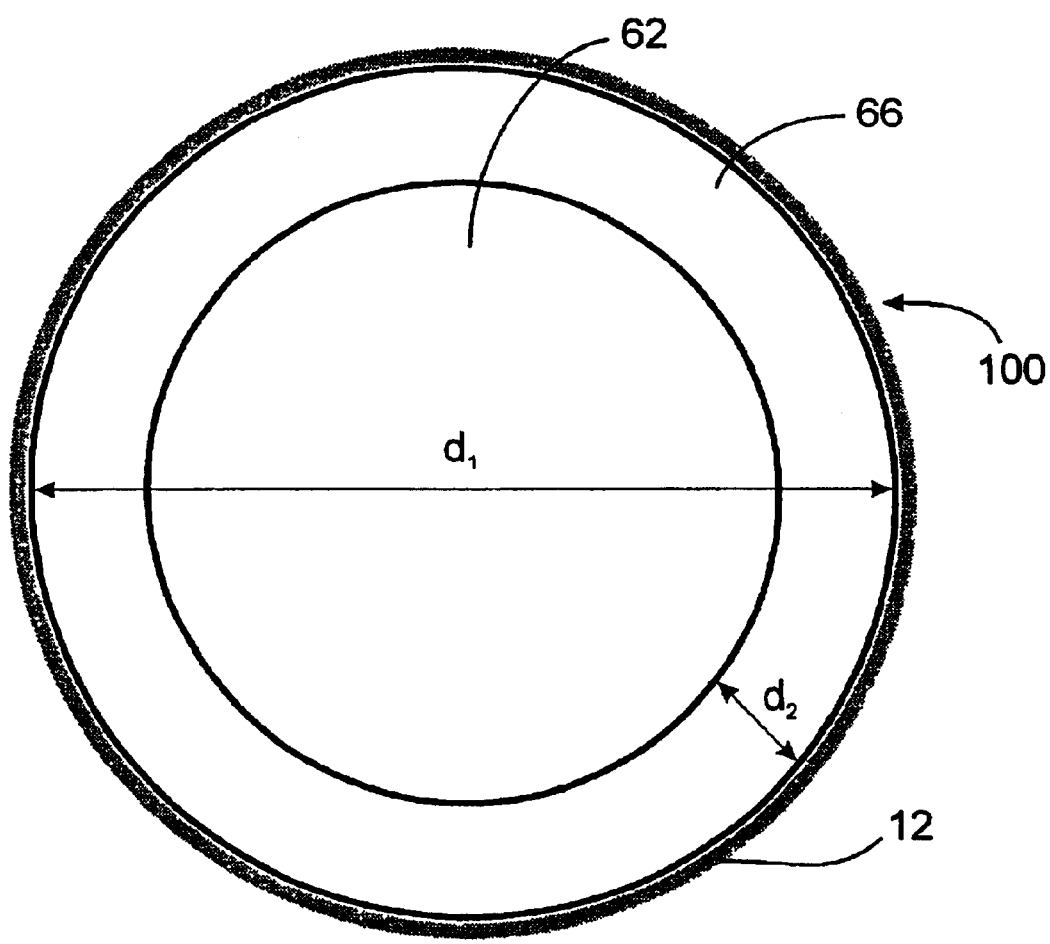

FIG. 14 illustrates a preferred embodiment of the one-dish frozen dinner product 100 of this invention having a crust 64, filling 62, and bread ring 66 within the baking pan or receptacle 12 with rolled edge 20. The rolled edge 20 is adapted to accept the baking shield (not shown). Of course, other baking shields and methods of attachment to the pan 20 can be used. FIGS. 6 and 7 illustrate another embodiment of the one-dish frozen dinner product of this invention in combination with the baking apparatus (receptacle 12 and baking shield 30) in proper configuration for baking. FIG. 8 illustrates a kit 90 have a similar embodiment of the one-dish frozen dinner product of this invention in combination with the baking apparatus (receptacle 12 and baking shield 30) packaged within outer carton 94. Any of the embodiments of the baking apparatus described above can be used for the present one-dish frozen dinner product of the present invention so long as the baking shield 30 protects the integral bread ring during baking in order to prevent overcooking.

Figure 15:
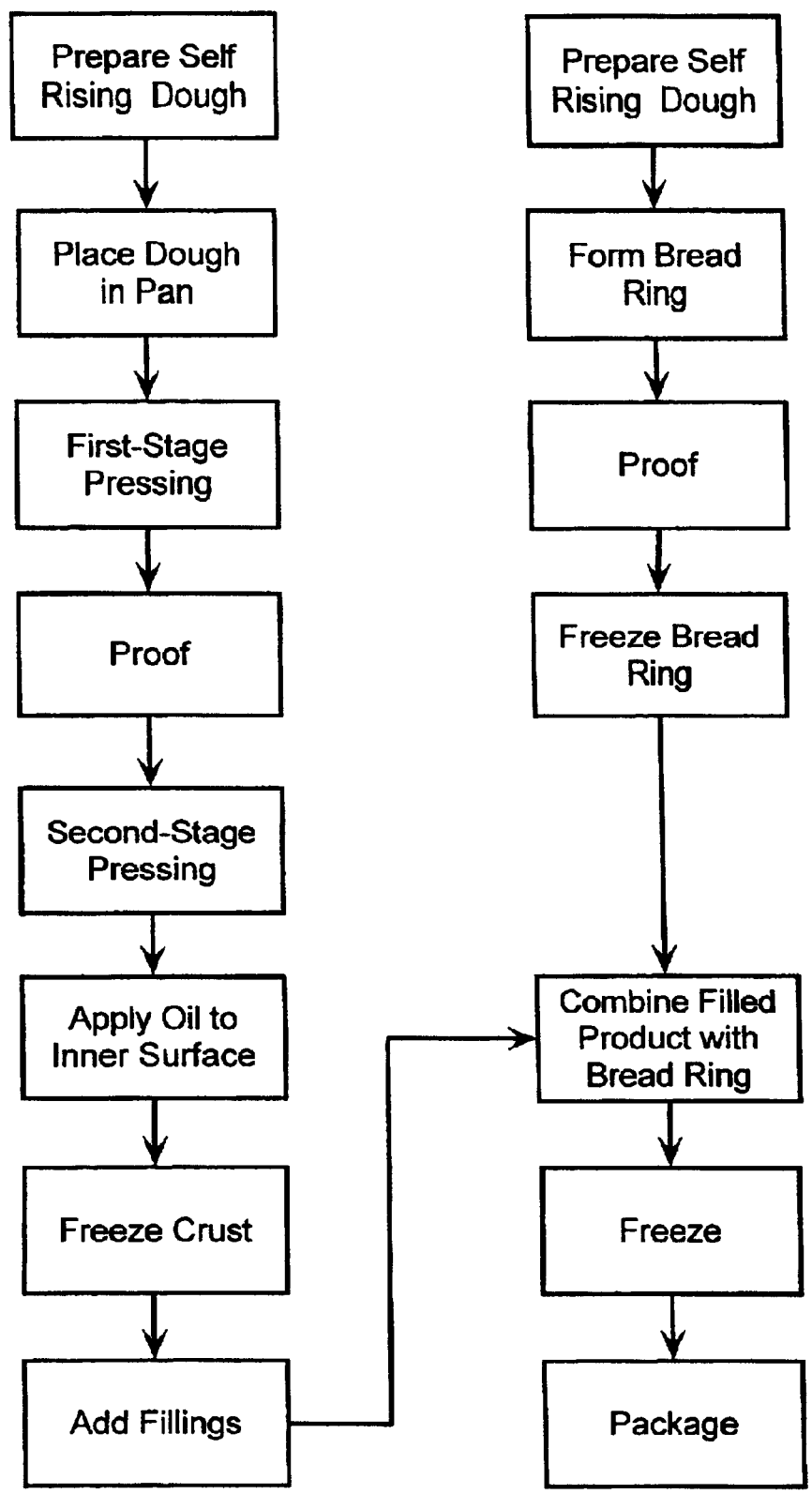
FIG. 15 is a flowchart illustrating a general method of preparing the one-dish frozen dinner product with an integral bread ring of this invention.

Preparing Crust and Bread Ring as Separate Components to be Combined During on Process Line. FIG. 15 provides a flowchart illustrating the general method for preparing one-dish frozen dinner products of the present invention. As shown in this figure, the crust and bread ring are preferably prepared in separate processes and then combined, after adding the filling to the crust, before freezing and final packaging. The dough for the crust and bread ring can have the same formulation or different formulations as desired. For example, since the bread ring is intended to be "torn off" for consumption as a bread product by the ultimate consumer, the formulation for the bread ring may have components which enhance fresh bread taste, aroma, and/or other organoleptic properties. Ingredients used to prepare the dough are widely known in the baking arts. Such ingredients include flour or a mixture of various varieties of flour; milk and/or water; and oil, such as vegetable oil, melted shortening, or a fat. The dough may optionally further contain salt, sugar, stabilizers, preservatives, spices, and/or additional ingredients that enhance flavor, texture, aroma, and/or color. Preferably, the dough for both the crust and bread ring is of the self-rising type and, therefore, includes an leavening agent such as yeast.

Although other dough formulations can be used, a preferred dough formulation for either or both of the crust and bread ring comprises, in Baker's percentages, about 100 lbs flour, about 2 to about 12 percent sugar, about 0 to about 2 percent dough emulsifier (e.g., sodium stearoyl lactate, calcium stearoyl lactate, mono- and di-glycerides, ethoxylated mono- and di-glycerides, diacetyl tartaric acid esters of mono- and di-glycerides, and the like as well as mixtures thereof), about 1 to about 7 percent leavening agent (e.g., baking soda, baking powder, sodium bicarbonate, yeast, sodium aluminum phosphate, and the like as well as mixtures thereof), about 1 to about 10 percent wheat gluten, about 2 to about 20 percent edible oil (e.g., vegetable oil, corn oil, canola oil, soybean oil, and the like as well as mixtures thereof) and/or solid fat (e.g., shortening, butter chips, and the like as well as mixtures thereof), about 20 to about 400 ppm dough oxidant (e.g., ascorbic acid, calcium iodate, potassium iodate, azodicarbon amide, calcium peroxide, and the like as well as mixtures thereof), about 1 to about 5 percent spices/flavorants (e.g., salt or other spices), and about 40 to about to about 80 percent water. More preferably, the dough formulation, in Baker's percentage, comprises about 100 lbs percent flour, about 6 to about 10 percent sugar, about 0.25 to about 0.75 percent dough emulsifier, about 2 to about 6 percent leavening agent, about 4 to about 8 percent wheat gluten, about 6 to about 10 percent edible oil and/or solid fat, about 100 to about 200 ppm dough oxidant, about 1 to about 5 percent spices/flavorants, and about 50 to about to about 70 percent water. The dough is prepared using conventional techniques. Generally, the preferred dough emulsifier is sodium stearoyl lactate; the preferred leavening agent is sodium bicarbonate, yeast, sodium aluminum phosphate, or mixtures thereof; the preferred edible oil is vegetable oil; and the preferred dough oxidant is ascorbic acid.

To prepare the crust 64, an appropriate amount of raw dough is placed in an appropriate baking pan or other container. Preferably, the pan used to form the crust is also used as the final baking apparatus and is fitted to accept the appropriate baking shield described above. Thus, in a preferred embodiment, the crust remains in the same pan throughout the assembly and packaging operation as well as during cooking by the ultimate consumer. The dough in the pan is then subjected to a first pressing operation. In this first pressing operation, the dough is pressed into a flat layer with sufficient force and in a manner to force the outside edge of the dough approximately halfway up the sidewall of the pan. Preferably, the dough is first sheeted (generally to a thickness of about 12 to 16 mm) and cut into an appropriate form or shape (e.g., a circle for a round baking pan) before the first pressing operation; again the pressing should be of sufficient force and in a manner to force the outside edge of the dough approximately halfway (i.e., about 25 to about 75 percent) up the sidewall of the pan. Using the preferred sheeted dough, the first pressing is generally carried out at a temperature of about 160 to about 200° F. and a pressure of up about 30 tons. More preferably, the first pressing is carried out at a temperature of about 170 to about 190° F. and a pressure of about 10 to about 20 tons. Other forms of the dough may require different press pressures. After the first pressing operation, the partially formed crust is generally about 8 to 12 mm thick.

After the first pressing operation, the partially formed crust is proofed. Generally proofing is carried out at a temperature of about 80 to about 130° F. and a relative humidity of about 40 to about 100 percent for about 20 to about 70 minutes. More preferably, the partially formed crust is proofed at a temperature of about 100 to about 110° F. and a relative humidity of about 80 to about 90 percent for about 30 to about 55 minutes. After proofing, the dough is sufficiently relaxed for the second-stage or final pressing operation. In this second-stage pressing, the pressing should be of sufficient force and in a manner to force the outside edge of the dough completely up the sidewall of the pan (i.e., at least 90 percent up the sidewall). The second pressing is generally carried out at a temperature of about 160 to about 200° F. and a pressure of up to about 30 tons. More preferably, the second pressing is carried out at a temperature of about 170 to about 190° F. and a pressure of about 10 to about 20 tons. The pressures used during the first and second pressing are, of course, adjusted to achieve the desired extension of the dough up the sidewall. After the second pressing operation, the fully formed crust is generally about 4 to 8 mm thick and extends up to, or very near to (i.e., at least about 90 percent), the top of the sidewall of the baking pan.

The fully formed crust is frozen. A thin layer of oil is applied to the inside surfaces of the fully formed crust either before or after the crust is frozen. The oil prevents excessive soaking of the crust by later applied sauce. Generally, for a 10 inch diameter crust, about 1 to about 5 g oil is applied; preferably, about 1 to about 3 g is applied. Suitable oils include, for example, olive oil, soybean oil, Canola oil, vegetable oil, and the like as well as mixtures thereof. The preferred oil is vegetable oil. The oil is preferably applied by spraying either before or after the fully formed crust is frozen. Preferably the fully formed crust is frozen using a spiral freezer operated at less than about −35° F. Once frozen, the fully formed crust can be used immediately or can be stored in a frozen condition for up to about 10 to 12 days. Preferably, the storage time for the fully formed frozen crust before completing the filling and packaging process is minimized (i.e., generally less than about 4 days, preferably less than about 1 day, and most preferably less than about 4 hours).

Figure 16A:
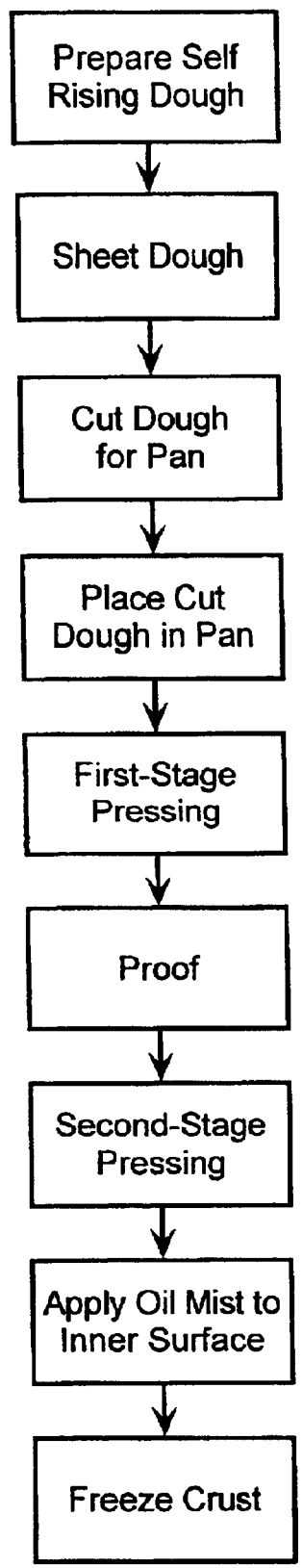
FIG. 16 contains flowcharts illustrating preferred methods of preparing the crust (Panel A) and the bread ring (Panel B) for the one-dish frozen dinner product of this invention.

A preferred process for preparing the fully formed frozen crust is illustrated in FIG. 16A. In this preferred embodiment, the self rising dough is prepared and then sheeted to a thickness of about of about 8 to 16 mm (more preferably about 8 to about 12 mm). The sheeted dough is then cut to the appropriate size and shape (preferably a circle with a diameter of about 4 to about 10 inches, and even more preferably about 7 to about 8 inches for a 10 inch diameter circular baking pan) and then placed in the bottom of an appropriate pan (see, e.g., FIGS. 1, 6, and 7). Preferably the pan is round aluminum baking pan with a diameter of about 8 to about 10 inches and outwardly slanting sidewalls about 1 to about 3 inches high wherein the sidewalls form an angle of about 35 to about 40° with the bottom of the pan. Of course, the pan is preferably adapted to accept a baking shield as described above for baking the final product. As those skilled in the art will realize, different shaped and dimensioned baking pans can, of course, be used.

Figure 16B:
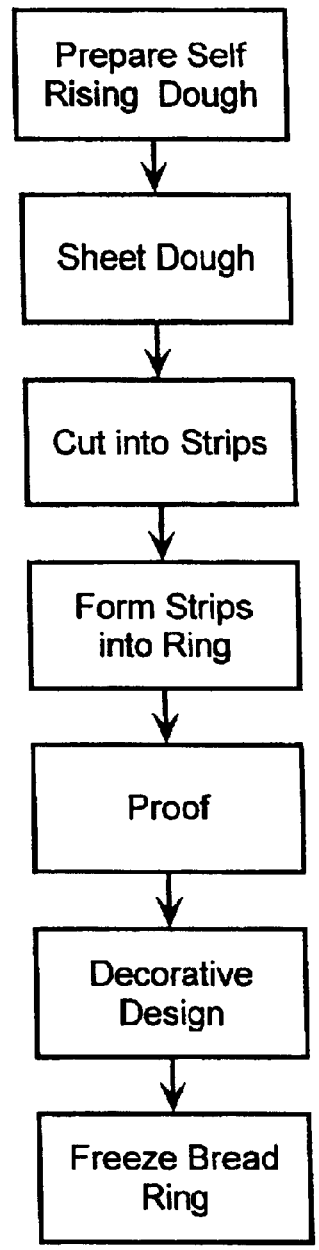

The bread ring 66 is prepared using an appropriate amount of raw dough. The bread ring dough formulation may be the same as, or different from, the dough used to prepare the crust. The raw dough is formed into the desired bread ring shape corresponding to the desired shape of the one-dish frozen dinner products of the present invention. Preferably a mold is used to help maintain the bread ring in the desired shape during proofing and subsequent freezing. For preferred circular one-dish frozen dinner products as shown in FIG. 14, the bread ring, after baking, has an outside diameter $d_1$ and a cross-sectional diameter $d_2$. The bread ring 66 can be formed using conventional techniques. For example, the raw dough may be formed into a long cylinder or other shapes and then the two ends jointed. If desired, the long cylinder or other shapes may be twisted before joining the ends to give the bread ring an appealing design; alternatively, an appealing design can be pressed or otherwise formed in the bread ring before or after joining the ends. Preferably, as shown in FIG. 16B, the dough may be sheeted (generally to a thickness of about 8 to about 16 mm and more preferably about 10 to about 14 mm), cut into long strips, and then formed into the desired bread ring shape by joining and crimping the ends in the desired circular or other shape. Again, appealing designs may be pressed or otherwise formed in the bread ring. Other methods can, of course, be used to prepare the desired bread ring shape. Once formed, the bread ring is proofed. Generally proofing is carried out at a temperature of about 80 to about 130° F. and a relative humidity of about 40 to about 100 percent for about 20 to about 75 minutes. More preferably, the bread ring is proofed at a temperature of about 100 to about 110° F. and a relative humidity of about 80 to about 90 percent for about 30 to about 55 minutes. After proofing, the bread ring is frozen. Preferably the fully formed bread ring is frozen using a spiral freezer operated at less than about −35° F.

As noted above and as shown in FIG. 14, the preferred bread ring has an outside diameter $d_1$ and a cross-sectional diameter $d_2$. Such a preferred torus-shaped bread ring has an outside diameter $d_1$ and an inner diameter of $(d_1-2d_2)$. The outside diameter $d_1$ of the bread ring is preferably approximately equal to, or slightly less than, the inside diameter of the pan or receptacle 12. In other words, the outside diameter of the bread ring is such that the bread ring, when combined with the filled crust, does not extend past the outer edges of the pan or receptacle 12. The cross-sectional diameter $d_2$ is generally adjusted so that the baked bread ring has a cross-sectional diameter of about ¾ to about 1 inch. Of course, other dimensions can be used if desired.

Both the crust 64 and the bread ring 66 should be kept frozen throughout the remainder of the manufacturing process as well as during shipping to, and sale by, the retailer and storage by the consumer. As shown in FIG. 15, the appropriate fillings are added to the frozen crust and the bread ring applied. The combined product is then frozen, preferably in a spiral freezer operated at less than about −35° F., and then packaged for retail sale.

Figure 17:
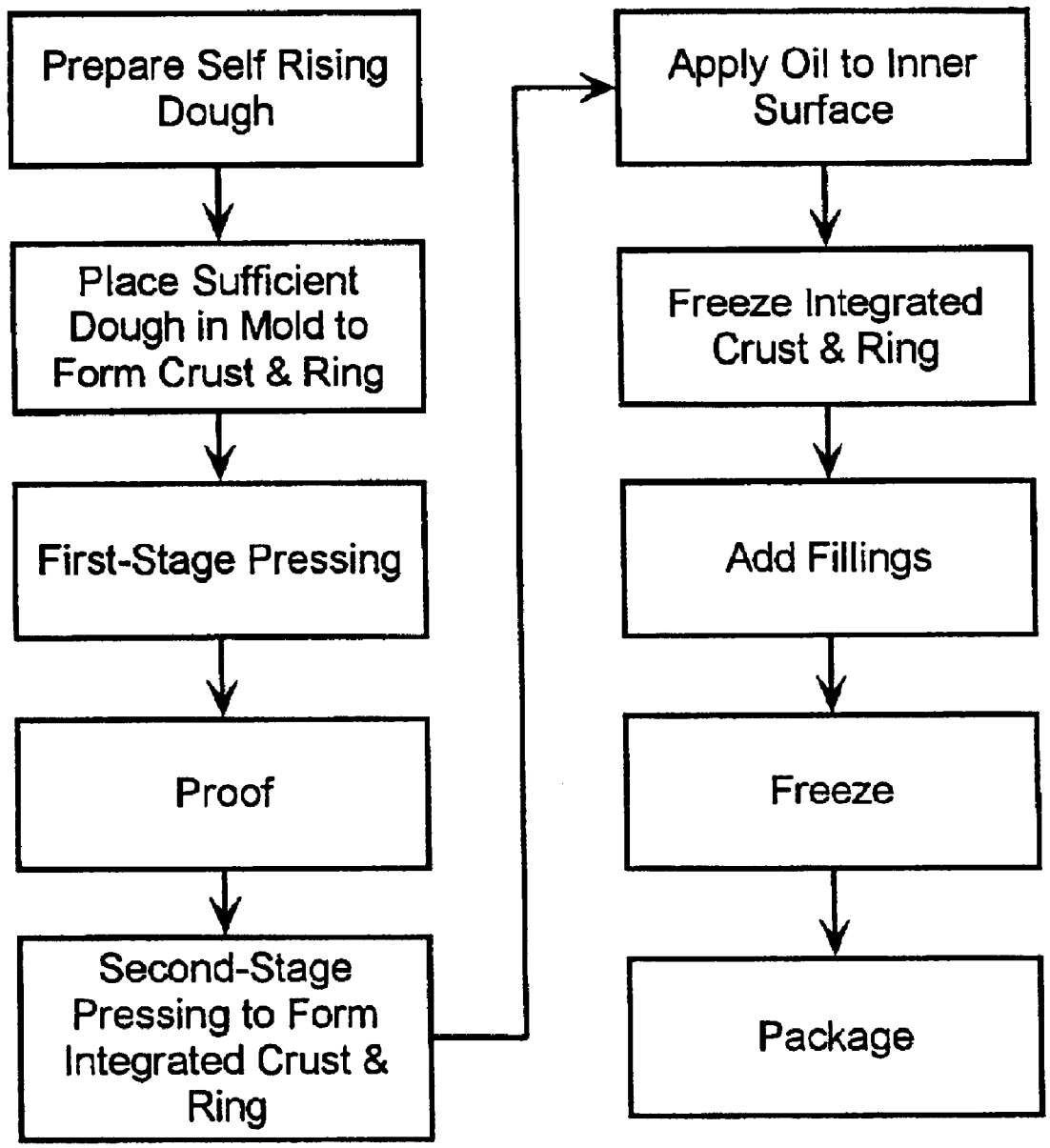
FIG. 17 is a flowchart illustrate a preferred method of preparing the crust and the bread ring for the one-dish frozen dinner product of this invention in a single operation.

Process for Preparing Crust and Bread Ring as an Integral Unit in a Single Process Line. Although the crust and bread ring can be prepared in separate steps and then combined in a later process, as described above, a simplified integrated process has now been developed wherein the crust and bread ring are prepared simultaneously in a single processing line. This integrated process provides significantly economic and manufacturing benefits as compared to the original process. This integrated process, which relies upon a single mold for forming the crust and bread ring as a single unit, is illustrated in FIG. 17. Generally, the same dough as described above can be used to prepare the crust and unit as a single unit. FIG. 18 illustrates the final one-dish frozen dinner product formed using the method of FIG. 17. FIG. 19 illustrates a suitable mold for forming the one-piece bread crust and bread ring using the method illustrated in FIG. 17.

To prepare the crust and ring 65 (see FIG. 18) as a single unit, an appropriate amount of raw dough (i.e., sufficient to form both the crust and the ring) is placed in an appropriate baking pan 100 or other container. Preferably, the pan 100 used to form the crust/ring 65 is also used as the final baking apparatus and is fitted to accept the appropriate baking shield described above. Thus, in a preferred embodiment, the crust/ring 65 remains in the same pan 100 throughout the assembly and packaging operation as well as during cooking by the ultimate consumer. The dough in the pan is then subjected to a first pressing operation. In this first pressing operation, the dough is pressed into a flat layer with sufficient force and in a manner to force the outside edge of the dough approximately halfway up the sidewall of the pan. Preferably, the dough is first sheeted (generally to a thickness of about 4 to 10 mm) and cut into an appropriate form or shape (e.g., a circle for a round baking pan) before the first pressing operation; again the pressing should be of sufficient force and in a manner to force the outside edge of the dough approximately halfway (i.e., about 25 to about 75 percent)

up the sidewall of the pan. Using the preferred sheeted dough, the first pressing is generally carried out at a temperature of about 160 to about 200° F. and a pressure of up about 30 tons. More preferably, the first pressing is carried out at a temperature of about 170 to about 190° F. and a pressure of about 10 to about 20 tons. Other forms of the dough may require different press pressures. After the first pressing operation, the partially formed crust/ring is generally about 2 to 5 mm thick at the bottom of the pan.

After the first pressing operation, the partially formed crust/ring is proofed. Generally proofing is carried out at a temperature of about 80 to about 130° F. and a relative humidity of about 40 to about 100 percent for about 20 to about 70 minutes. More preferably, the partially formed crust/ring is proofed at a temperature of about 100 to about 110° F. and a relative humidity of about 80 to about 90 percent for about 30 to about 55 minutes. After proofing, the dough is sufficiently relaxed for the second-stage or final pressing operation. In this second-stage pressing, the pressing should be of sufficient force and in a manner to force the outside edge of the dough up the sidewall of the pan and form the desired bread ring. The second pressing is generally carried out at a temperature of about 160 to about 200° F. and a pressure of up to about 30 tons. More preferably, the second pressing is carried out at a temperature of about 170 to about 190° F. and a pressure of about 10 to about 20 tons. The pressures used during the first and second pressing are, of course, adjusted to achieve the desired extension of the dough up the sidewall and to form the desired bread ring. After the second pressing operation, the fully formed crust/ring is generally about 4 to 8 mm thick at the bottom of the pan and forms the desired bread ring.

The fully formed crust/ring is frozen. A thin layer of oil is applied to the inside surfaces of the fully formed crust/ring either before or after the crust/ring is frozen. The oil prevents excessive soaking of the crust/ring by later applied sauce. Generally, for a 10 inch diameter crust/ring, about 1 to about 5 g oil is applied; preferably, about 1 to about 3 g is applied. Suitable oils include, for example, olive oil, soybean oil, Canola oil, vegetable oil, and the like as well as mixtures thereof. The preferred oil is vegetable oil. The oil is preferably applied by spraying either before or after the fully formed crust/ring is frozen. Preferably the fully formed crust/ring is frozen using a spiral freezer operated at less than about −35° F. Once frozen, the fully formed crust/ring can be used immediately or can be stored in a frozen condition for up to about 10 to 12 days. Preferably, the storage time for the fully formed frozen crust/ring before completing the filling and packaging process is minimized (i.e., generally less than about 4 days, preferably less than about 1 day, and most preferably less than about 4 hours). The filling can be applied and the product packaged as described above.

Figure 18A:
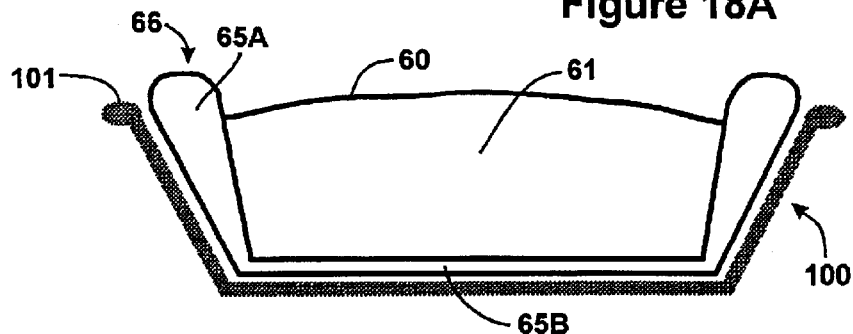
FIG. 18 provides cross-sectional side views of the one-dish frozen dinner product having crust/ring combinations (i.e., a one-piece bread curst and bread ring) prepared using the method illustrated in FIG. 17. Panel A illustrates a straight-sided pan and crust/ring combination; Panel B provides a partial view of a curved-sided pan and crust/ring combination.
Figure 18B:
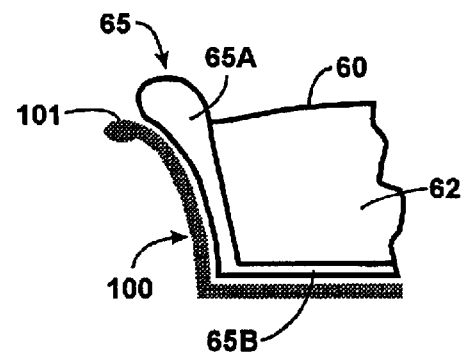

FIGS. 18A and 18B illustrate the finished products produced using the method illustrate in FIG. 17. The product is contained in pan 100 having a sealing surface 101 around the outside edge or rim. The actual product consists of the crust/ring combination or one-piece bread crust and bread ring 65 and the filling 62. The crust/ring combination 65 is formed from an essentially single unit of dough and consists of the bread ring portion 65A and the crust portion 65B. The product illustrated in FIG. 18A is formed in a pan 100 having an essentially straight sidewall and, therefore, has an essentially straight profile along the sides. The product illustrated in FIG. 18B is formed in a pan 100 having a curved sidewall and, therefore, has a curved profile along the sides. Of course, other shapes or designs can be incorporated into the sidewalls to modify the ultimate shape of the one-dish frozen dinner product.

Figure 19A:
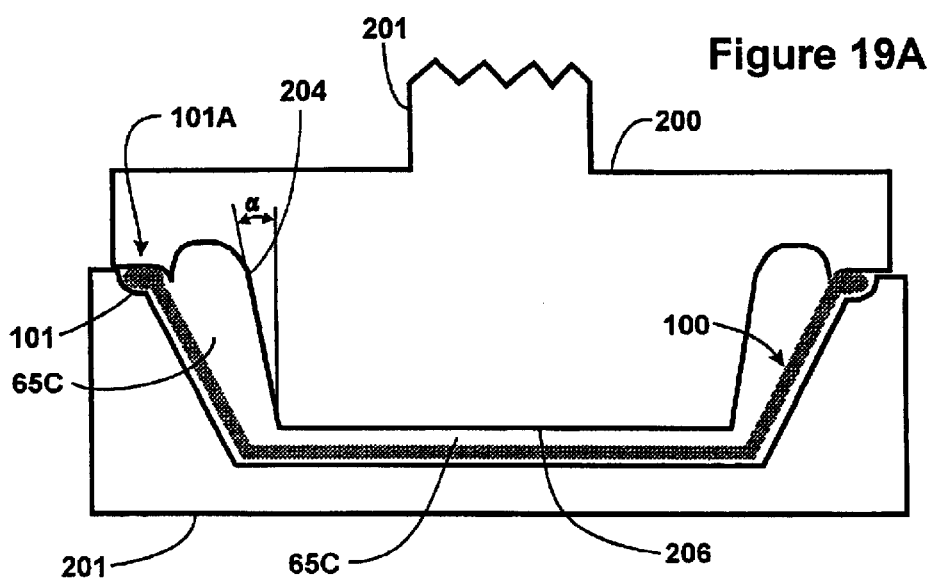
FIG. 19 illustrates a mold suitable for preparing the one-dish frozen dinner product of this invention in the straight-sided pan of FIG. 18A using the method illustrate in FIG. 17. Panel A provides a side view with the mold in combination with the pan. Panel B provides a view of the male portion of the mold view from the bottom along the vertical axis and additionally includes projections into the cavity to provide indentations or other designs in the final product. Panel C provides a side view of one of the projections from Panel B.

FIG. 19A illustrates a mold, in combination with the pan, that can be used to produce the one-dish frozen dinner product using the method of FIG. 17. The male portion 200 of the mold has a shaft 208 and is adapted to move up and down to provide the necessary pressing force using a suitable press. The portion 200 has inner pressing surfaces 204 and 206 adapted to contact the dough during the pressing operation. Surfaces 204 and 206 help define the bread ring and the crust portions, respectively. The fixed portion 202 of the mold is adapted to accept pan 100. The sealing surface 101 of the pan 100 and the sealing surfaces 101 A of the mold 200 are adapted to form a seal. When the pan 100 and mold 200 are brought into contact at their respectively sealing surfaces 101 and 101 A, a cavity 65C is formed in the desired shape of the bread ring/crust combination 65. Generally, the angle $\alpha$ formed between the surface 24 and the vertical axis of the mold as shown in FIG. 19A is greater than or equal to about 0° so as to allow the male portion 200 to be easily removed once the bread ring/crust combination 65 is formed; preferably, $\alpha$ will be about 0° to about 10°.

FIG. 19B illustrates the male portion 200 viewed from below. Projections 210 from the mold 200 project into the cavity 65C, as shown in FIGS. 19B and 19C, and provide indentations or other designs in the final bread ring/crust combination. Such projections can be used to merely provide a pleasing or attractive design or can be used to provide indentations which allow, for example, portions of the bread ring to be pulled off more easily by the ultimate consumer during consumption of the final product. Such projections 210 may be located around the mold 200 in a symmetrical or non-symmetrical manner as desired; such projections 200 may be of the same or of different shapes.

Preferably, the assembled (i.e., FIG. 15 process where the crust and bread ring are formed separately) or formed (i.e., FIG. 17 process where the curst and bread ring are formed as an integral unit) one-dish frozen dinner products of the present invention are preferably sealed in a plastic wrap or overwrap with a low-oxygen, inert atmosphere (preferably a carbon dioxide atmosphere) and then placed in an appropriate outer carton (i.e., carton 94 in FIG. 8 or carton 150 in FIG. 11). More preferably, the plastic wrap is of the shrink wrap type so that it closely conforms to the shape of the one-dish frozen dinner product but does not crush it. The appropriate baking shield can be contained within the plastic wrap or simply included as a separate item within the carton as desired; as shown in FIGS. 8 and 11, the baking shield is preferably in a nested relationship with the baking pan or receptacle 12.

As noted above, the filling mixture generally contains a blend of ingredients selected from the group consisting of pasta, potatoes, meat (e.g., beef, lamb, chicken, turkey, or fish), vegetables, cheese, and sauce. The filling components may be added to the crust separately (i.e., one at a time) or blended together and then added to the crust. Examples of suitable fillings include, but are not limited to, chicken and potatoes in cheese sauce; chicken and pasta in marinara sauce; chicken and vegetables in Alfredo sauce; lasagna with meat sauce; vegetable lasagna; cheese ravioli with meat sauce; cheese ravioli with marinara sauce; chicken, broccoli and rotini in a cheese sauce; beef stew; Italian sausage with pasta in marinara sauce; vegetables and pasta in cheese sauce; vegetables and pasta in marinara sauce; and the like. For pasta and vegetable-containing fillings, the pasta and vegetables are preferably completely covered by the sauce to prevent them from drying out during cooking. For dinner products containing tomato-based sauces (i.e., red sauces), it is generally preferred that a first portion of the sauce be placed directly in the frozen crust, followed by meat, pasta, and/or vegetables, with a second portion of sauce added last. For dinner products containing cheese- or cream-based sauces (i.e., white sauces), it is generally preferred that the meat, pasta, and/or vegetables be added first followed by addition of the entire amount of sauce. Preferably, all ingredients (e.g., meat, pasta, and/or vegetables) are cooked prior to addition and are in bite-sized pieces. Generally, neither dried pasta nor thin-wall pasta should be used since they will not hydrate as well as desired during cooking. The one-dish frozen dinner products of this invention are generally intended to be prepared by the ultimate consumer in a conventional oven.

The following examples are intended to illustrate the invention and not to limit it. Unless otherwise noted, all percentages are by weight.

Example 1

This example illustrates the preparation of an oven roasted chicken and potato dinner in a Parmesan cheese sauce. The dough formulation, used for both the crust and the bread ring, was about 51 percent flour, about 4 percent sugar, about 0.25 percent sodium stearoyl lactate, about 0.25 percent sodium aluminum phosphate, about 3 percent wheat gluten, about 0.25 percent sodium bicarbonate, about 2 percent corn oil, about 1.4 percent yeast, about 0.02 percent ascorbic acid, about 6.3 percent butter flavored shortening flakes, and about 1.3 percent salt with the balance being water (about 30 percent). The dough was prepare using a horizontal bar mixer with a batch time of about 20 to about 25 minutes. Sugar, sodium stearoyl lactate, sodium aluminum phosphate, wheat gluten, sodium bicarbonate, corn oil, and yeast, were added to the mixer; ascorbic acid dissolved in a small portion of the water was also added. Flour, water, and corn oil from bulk holding tanks were then added with mixing. Mixing under low speed was continued for about 2 minutes followed by high speed mixing for about 15 minutes; salt was added with about 4 minutes of high speed mixing remaining. The butter flavored shortening flakes were added last and mixing continued for about 2 minutes. The final dough temperature was about 75 to about 82° F. The resulting fully developed dough was cream colored with visible butter chips and a yeasty odor.

The raw dough is then feed into a horizontal sheeter to form a dough sheet about 12 mm thick. The dough is sheeted to about 10 mm thick and then cut into approximately 7¾ inch circles (about 270 g). The dough circles are then placed in the bottom of aluminum baking pans (about 10 inches in diameter and about 1½ inches high with a sidewall angle of about 36°). Using a first-stage pressing operation (dwell time about 2 seconds), the dough is pressed and flattened to about 8 mm thick such that the dough is forced about half way up the sidewall. After the first-stage pressing, the partially formed dough crust, while still in the aluminum pan, is proofed at about 85 percent relative humidity and about 40 to 41° F. for about 45 minutes. After proofing, the partially formed dough crust is subjected to a second-stage pressing (dwell time again about 2 seconds), thereby reducing the thickness to about 6 mm and forcing the dough all the way up the sidewall. The fully formed dough crusts are then frozen in a spiral freezer operating at −35° F. to an internal temperature of less than about −23° F. The interior surfaces of the frozen crusts were then misted with vegetable oil (about 1 to 3 g) and stored frozen until the final dinner products are assembled.

The bread rings are prepared using the same raw dough sheeted to about 12 mm thick which was then cut into strips about 12 mm wide and about 30 inches long (weight of about 162.5 g). The ends of the strips are then joined by crimping to form a bread ring with an outside diameter of about 10 inches and cross-sectional dimensions of about 12 by about 12 mm. The bread rings are placed in a mold and are then proofed at about 100 to about 110° F. and about 80 to 90 percent relative humidity for about 30 to 50 minutes. After proofing, the bread ring has a cross-sectional diameter of about 16 mm. While still in the mold, a decorative design is formed on the proofed rings using a heated press. The bread rings are then frozen to an internal temperature of less than about −10° F. and stored frozen until the final dinner products are assembled.

To complete assembly, the filling components are weighed and blended into the frozen crust. After the filling has been added, the frozen bread ring is placed on the top of the frozen crust; care is taken to insure that the bread ring remains frozen during the assembly operation. The composition of the oven roasted chicken and potato dinner in a Parmesan cheese sauce is as follows:

| Ingredient | Amount (g) | Amount (%) |
|---|---|---|
| Frozen Crust (w/ oil) | 270 | 25.9 |
| IQF* Roasted Potato | 175 | 16.8 |
| IQF* Carrot Slices | 40 | 3.8 |
| IQF* Oven Roasted Chicken | 150 | 14.5 |
| Parmesan Cheese Sauce | 244 | 23.4 |
| Bread Ring | 162.5 | 15.6 |

*Instantly quick frozen

The potatoes, carrots, and chicken are pre-cooked and instantly quick frozen prior to their addition directly into the crust; the sauce is then added directly on top of the other ingredients. Once the dinner product is assembled, the product is frozen in a spiral freezer operating at −35° F. to an internal temperature of less than about −23° F. and stored frozen. The resulting dinner product can be cooked at about 400 to about 425° F. for about 1 hour in a conventional oven using the baking shield described above to protect the bread ring from overcooking. After baking, the bread ring has a cross-sectional diameter of about ¾ to about 1 inch.

Example 2

This example illustrates the preparation of a two cheese ravioli with meat sauce dinner. The frozen crust and bread ring were prepared as described in Example 1. The composition of the two cheese ravioli with meat sauce dinner is as follows:

| Ingredient | Amount (g) | Amount (%) |
|---|---|---|
| Frozen Crust (w/ oil) | 270 | 24.4 |
| Marinara Sauce | 50 | 4.5 |
| IQF* Two Cheese Ravioli | 230 | 20.8 |
| Shredded Mozzarella Cheese | 101 | 9.1 |
| Meat Sauce | 294 | 26.6 |
| Bread Ring | 162.5 | 14.6 |

*Instantly quick frozen

The marinara sauce was added directly to the frozen crust, followed by the ravioli and cheese, and then topped off with the meat sauce. Once the bread ring is added, the product is frozen in a spiral freezer operating at −35° F. to an internal temperature of less than about −23° F. and stored frozen. The resulting dinner product can be cooked at about 400 to about 425° F. for about 1 hour in a conventional oven using the baking shield described above to protect the bread ring from overcooking.

Example 3

This example illustrates the preparation of a chicken Parmesan with pasta dinner. The frozen crust and bread ring were prepared as described in Example 1. The composition of the chicken Parmesan with pasta dinner is as follows:

| Ingredient | Amount (g) | Amount (%) |
|---|---|---|
| Frozen Crust (w/ oil) | 270 | 24.0 |
| Marinara Sauce (1st portion) | 50 | 4.4 |
| IQF* White Meat Chicken | 140 | 12.4 |
| IQF* Penne (cut or full) | 150 | 13.3 |
| Shredded Mozzarella Cheese | 101 | 9.0 |
| Marinara Sauce (2st portion) | 247 | 22.0 |
| Shredded Parmesan Cheese/Spice Blend | 5 | 0.4 |
| Bread Ring | 162.5 | 14.5 |

*Instantly quick frozen

The first portion of the marinara sauce was added directly to the frozen crust, followed by the chicken, pasta, and mozzarella cheese, the second portion of the marinara sauce, and finally the cheese/spice blend. Once the bread ring is added, the product is frozen in a spiral freezer operating at −35° F. to an internal temperature of less than about −23° F. and stored frozen. The resulting dinner product can be cooked at about 400 to about 425° F. for about 1 hour in a conventional oven using the baking shield described above to protect the bread ring from overcooking.

Example 4

This example illustrates the preparation of a chicken vegetable Alfredo dinner. The frozen crust and bread ring were prepared as described in Example 1. The composition of the chicken vegetable Alfredo dinner is as follows:

| Ingredient | Amount (g) | Amount (%) |
|---|---|---|
| Frozen Crust (w/ oil) | 270 | 24.8 |
| IQF* Bow Tie Pasta | 123.3 | 11.3 |
| IQF* White Meat Chicken | 123.3 | 11.3 |
| IQF* Broccoli Florets | 35 | 3.2 |
| IQF* Carrot Slices | 35 | 3.2 |
| Shredded Parmesan Cheese | 95 | 8.7 |
| Alfredo Sauce | 247 | 22.6 |
| Bread Ring | 162.5 | 14.9 |

*Instantly quick frozen

The pasta, chicken, vegetable, and cheese were added directly to the frozen crust, followed by the sauce. Once the bread ring is added, the product is frozen in a spiral freezer operating at −35° F. to an internal temperature of less than about −23° F. and stored frozen. The resulting dinner product can be cooked at about 400 to about 425° F. for about 1 hour in a conventional oven using the baking shield described above to protect the bread ring from overcooking.

The drawings and the foregoing descriptions and examples are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A method for preparing a one-dish frozen dinner kit, said method comprising:
    (A) preparing a frozen bread crust by:
        (1) providing a self-rising crust dough;
        (2) placing the self-rising crust dough in a baking apparatus, wherein the baking apparatus has a bottom, an open top, slanted sidewalls, and an outer rim at the open top;
        (3) pressing the self-rising crust dough in the baking apparatus in a first-stage pressing operation to prepare a partially formed bread crust, wherein the partially formed bread crust is about 8 to about 12 mm thick and extends approximately half way up the slanted sidewalls of the baking apparatus;
        (4) proofing the partially formed bread crust in the baking apparatus at about 80 to about 130 F. and a relative humidity of about 40 to about 100 percent for about 20 to about 75 minutes;
        (5) pressing the proofed partially formed bread crust in the baking apparatus in a second-stage pressing operation to prepare a bread crust, where in the bread crust is about is about 4 to about 8 mm thick and extends up the slanted sidewalls to the outer rim of the baking apparatus, wherein the bread crust conforms to the baking apparatus forming a cavity and has an interior surface for accepting a filling;
        (6) freezing the bread crust; and
        (7) applying oil to the interior of the bread crust either before or after freezing;
    (B) preparing a frozen bread ring by:
        (1) providing a self-rising bread ring dough;
        (2) forming the self-rising bread ring dough into a bread ring having an outer dimension to approximate the outer rim of the baking apparatus;
        (3) proofing the bread ring at about 80 to about 130° F. and a relative humidity of about 40 to about 100 percent for about 20 to about 75 minutes; and
        (4) freezing the proofed bread ring;
    (C) adding a filling to the interior surface of the frozen bread crust so as to essentially fill the cavity formed by the frozen bread crust, wherein the filling contains one or more components selected from the group consisting of pasta, meat, cheese, and vegetables and wherein a sauce covers the one or more components;
    (D) applying the frozen bread ring to the filled frozen bread crust such that the frozen bread ring rests on top of the filling and is in contact with the outer rim of the frozen bread crust to form a combined product;
    (E) freezing the combined product to produce a one-dish frozen dinner product; and
    (F) packaging the one-dish frozen dinner product in a shipping carton;
        wherein the one-dish frozen dinner product can be stored frozen in the shipping carton until ready to be cooked; and wherein, after cooking, portions of the bread ring can be removed and consumed as a bread product with the dinner product.

2. The method of claim 1, wherein the shipping carton also contains a detachable baking shield adapted to be attached to the baking apparatus and to prevent the bread ring from overcooking when the one-dish frozen dinner product is prepared for consumption.

3. The method of claim 2, wherein the baking apparatus is a frustoconical baking apparatus and the baking shield includes an upstanding sidewall to engage the outer rim of the baking apparatus so as to be upstanding therefrom when in an installed position and an upper wall inwardly extending from the upstanding sidewall so as to form a central opening when in the installed position.

4. The method of claim 3, wherein the baking shield and the baking apparatus are made of metal foil.

5. The method of claim 1, wherein the bread ring has a design applied before the bread ring is frozen.

6. The method of claim 3, wherein the bread ring has a design applied before it the bread ring is frozen.

7. The method of claim 1, wherein the partially formed bread crust is proofed at a temperature of about 100 to about 110° F. and a relative humidity of about 80 to about 90 percent for about 30 to about 55 minutes and wherein the bread ring is proofed at a temperature of about 100 to about 11 00 F and a relative humidity of about 80 to about 90 percent for about 30 to about 55 minutes.

8. The method of claim 1, wherein the frozen self-rising bread crust is prepared from a bread crust dough comprising, in Baker's percentages, about 100 percent flour, about 2 to about 12 percent sugar, about 0 to about 2 percent dough emulsifier, about 1 to about 7 percent leavening agent, about 1 to about 10 percent wheat gluten, about 2 to about 20 percent edible oil or solid fat, about 20 to about 400 ppm dough oxidant, about 1 to about 5 percent spices/flavorants, and about 40 to about to about 80 percent water and wherein the frozen self-rising bread ring is prepared from a bread ring dough comprising, in Baker's percentages, about 100 percent flour, about 2 to about 12 percent sugar, about 0 to about 2 percent dough emulsifier, about 1 to about 7 percent leavening agent, about 1 to about 10 percent wheat gluten, about 2 to about 20 percent edible oil or solid fat, about 20 to about 400 ppm dough oxidant, about 1 to about 5 percent spices/flavorants, and about 40 to about to about 80 percent water.

9. The method of claim 7, wherein the frozen self-rising bread crust is prepared from a bread crust dough comprising, in Baker's percentages, about 100 percent flour, about 2 to about 12 percent sugar, about 0 to about 2 percent dough emulsifier, about 1 to about 7 percent leavening agent, about 1 to about 10 percent wheat gluten, about 2 to about 20 percent edible oil or solid fat, about 20 to about 400 ppm dough oxidant, about 1 to about 5 percent spices/flavorants, and about 40 to about to about 80 percent water and wherein the frozen self-rising bread ring is prepared from a bread ring dough comprising, in Baker's percentages, about 100 percent flour, about 2 to about 12 percent sugar, about 0 to about 2 percent dough emulsifier, about 1 to about 7 percent leavening agent, about 1 to about 10 percent wheat gluten, about 2 to about 20 percent edible oil or solid fat, about 20 to about 400 ppm dough oxidant, about 1 to about 5 percent spices/flavorants, and about 40 to about to about 80 percent water.

10. The method of claim 8, wherein the bread crust dough comprises, in Baker's percentage, about 100 percent flour, about 6 to about 10 percent sugar, about 0.25 to about 0.75 percent dough emulsifier, about 2 to about 6 percent leavening agent, about 4 to about 8 percent wheat gluten, about 6 to about 10 percent edible oil or solid fat, about 100 to about 200 ppm dough oxidant, about 1 to about 5 percent spices/flavorants, and about 50 to about to about 70 percent water, and wherein the bread ring dough comprises, in Baker's percentage, about 100 percent flour, about 6 to about 10 percent sugar, about 0.25 to about 0.75 percent dough emulsifier, about 2 to about 6 percent leavening agent, about 4 to about 8 percent wheat gluten, about 6 to about 10 percent edible oil or solid fat, about 100 to about 200 ppm dough oxidant, about 1 to about 5 percent spices/flavorants, and about 50 to about to about 70 percent water.

11. The method of claim 9, wherein the bread crust dough comprises, in Baker's percentage, about 100 percent flour, about 6 to about 10 percent sugar, about 0.25 to about 0.75 percent dough emulsifier, about 2 to about 6 percent leavening agent, about 4 to about 8 percent wheat gluten, about 6 to about 10 percent edible oil or solid fat, about 100 to about 200 ppm dough oxidant, about 1 to about 5 percent spices/flavorants, and about 50 to about to about 70 percent water; and wherein the bread ring dough comprises, in Baker's percentage, about 100 percent flour, about 6 to about 10 percent sugar, about 0.25 to about 0.75 percent dough emulsifier, about 2 to about 6 percent leavening agent, about 4 to about 8 percent wheat gluten, about 6 to about 10 percent edible oil or solid fat, about 100 to about 200 ppm dough oxidant, about 1 to about 5 percent spices/flavorants, and about 50 to about to about 70 percent water.

12. A method for preparing a one-dish frozen dinner kit, said method comprising:

(A) preparing a frozen bread crust by:
  (1) providing a self-rising crust dough;
  (2) placing the self-rising crust dough in a baking apparatus, wherein the baking apparatus has a bottom, an open top, slanted sidewalls, and an outer rim at the open top;
  (3) pressing the self-rising crust dough in the baking apparatus in a first-stage pressing operation to prepare a partially formed bread crust, wherein the partially formed bread crust is about 8 to about 12 mm thick and extends approximately halfway up the slanted sidewalls of the baking apparatus;
  (4) proofing the partially formed bread crust in the baking apparatus at about 80 to about 130° F. and a relative humidity of about 40 to about 100 percent for about 20 to about 75 minutes;
  (5) pressing the proofed partially formed bread crust in the baking apparatus in a second-stage pressing operation to prepare a bread crust, where in the bread crust is about is about 4 to about 8 mm thick and extends up the slanted sidewalls to the outer rim of the baking apparatus, wherein the bread crust conforms to the baking apparatus forming a cavity and has an interior surface for accepting a filling;
  (6) freezing the bread crust in the baking apparatus; and
  (7) applying oil to the interior of the bread crust either before or after freezing;

(B) preparing a frozen bread ring by:
  (1) providing a self-rising bread ring dough;
  (2) forming the self-rising bread ring dough into a bread ring having an outer dimension to approximate the outer rim of the baking apparatus;
  (3) proofing the bread ring at about 80 to about 130° F. and a relative humidity of about 40 to about 100 percent for about 20 to about 75 minutes; and
  (4) freezing the proofed bread ring;

(C) adding a filling to the surface of the frozen bread crust in the baking apparatus so as to essentially fill the cavity formed by the frozen bread crust, wherein the filling contains one or more components selected from the group consisting of pasta, meat, cheese, and vegetables and wherein a sauce covers the one or more components;

(D) applying the frozen bread ring to the filled frozen bread crust such that the frozen bread ring rests on top of the filling and is in contact with the outer rim of the frozen bread crust to form a combined product;

(E) freezing the combined product in the baking apparatus to produce a one-dish frozen dinner product; and (F) packaging the one-dish frozen dinner product in a shipping carton;

wherein the one-dish frozen dinner product can be stored frozen in the shipping carton until ready to be cooked; and wherein, after cooking, portions of the bread ring can be removed and consumed as a bread product with the dinner product; and wherein the baking apparatus is used during cooking of the one-dish frozen dinner product.

* * * * *

UNITED STATES PATENT AND TRADEMARK OFFICE
CERTIFICATE OF CORRECTION

PATENT NO. : 6,743,452 B2
DATED : June 1, 2004
INVENTOR(S) : Gosselin et al.

It is certified that error appears in the above-identified patent and that said Letters Patent is hereby corrected as shown below:

Title page,
Item [75], Inventors, change "Zettlemeyer" to -- Zettlemoyer --; and change "Dublin, CA" to -- Modesto, CA --.

Column 18,
Line 28, delete "is about". (second occurrence)

Column 19,
Line 15, delete "it".
Line 21, change "11 00 F" to -- 110° F --.
Lines 31, 49, 57 and 66, delete "to about". (second occurrence)

Column 20,
Lines 7, 14 and 22, delete "to about". (second occurrence)
Line 44, delete "is about". (second occcurrence)

Signed and Sealed this

Fourteenth Day of December, 2004

JON W. DUDAS
*Director of the United States Patent and Trademark Office*